United States Patent
Chen et al.

(10) Patent No.: US 12,126,445 B2
(45) Date of Patent: Oct. 22, 2024

(54) CHANNEL SENDING METHOD AND DEVICE

(71) Applicant: VIVO MOBILE COMMUNICATION CO., LTD., Guangdong (CN)

(72) Inventors: Xiaohang Chen, Guangdong (CN); Lei Jiang, Guangdong (CN); Zhi Lu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 393 days.

(21) Appl. No.: 17/581,695

(22) Filed: Jan. 21, 2022

(65) Prior Publication Data
US 2022/0149992 A1   May 12, 2022

Related U.S. Application Data

(63) Continuation of application No. PCT/CN2020/103817, filed on Jul. 23, 2020.

(30) Foreign Application Priority Data

Jul. 23, 2019  (CN) .......................... 201910668206.4

(51) Int. Cl.
*H04L 1/08*  (2006.01)
*H04L 1/1812*  (2023.01)
(Continued)

(52) U.S. Cl.
CPC ............. *H04L 1/08* (2013.01); *H04L 1/1812* (2013.01); *H04W 72/0446* (2013.01); *H04W 72/21* (2023.01)

(58) Field of Classification Search
CPC . H04W 72/0446; H04W 72/21; H04W 72/23; H04L 1/08; H04L 1/1812; H04L 1/1819; H04L 1/189; H04L 1/1822
See application file for complete search history.

(56) References Cited

U.S. PATENT DOCUMENTS

| 2017/0222749 A1 | 8/2017 | Dinan |
| 2018/0124749 A1 | 5/2018 | Park et al. |

(Continued)

FOREIGN PATENT DOCUMENTS

| CN | 107667565 A | 2/2018 | |
| CN | 108307502 A | 7/2018 | |
| CN | 111278120 A * | 6/2020 | ............ H04B 7/022 |

OTHER PUBLICATIONS

Extended European Search Report for the European Patent Application No. 20844293.9 issued by the European Patent Office on Aug. 29, 2022.

(Continued)

*Primary Examiner* — Jianye Wu
(74) *Attorney, Agent, or Firm* — IP & T GROUP LLP

(57) ABSTRACT

A channel sending method includes: determining a first transmission parameter, where the first transmission parameter includes at least one of following: a time domain resource, an RV, or a HARQ process number, the time domain resource includes at least one of N candidate transmission opportunities, and the N candidate transmission opportunities correspond to M uplink channels; and sending P uplink channels based on the first transmission parameter. N, M, and P are all positive integers.

20 Claims, 6 Drawing Sheets

(51) Int. Cl.
*H04W 72/0446* (2023.01)
*H04W 72/21* (2023.01)

(56) References Cited

U.S. PATENT DOCUMENTS

| | | |
|---|---|---|
| 2018/0249494 A1 | 8/2018 | Matsumoto et al. |
| 2019/0044663 A1* | 2/2019 | Rosa ..................... H04L 1/1812 |
| 2019/0191416 A1 | 6/2019 | Xie et al. |

OTHER PUBLICATIONS

Considerations on frame structure for NR unlicensed operations, 3GPP TSG RAN WG1 Meeting #93, May 21-25, 2018, R1-1806567, Sony, Busan, Korea.
Discussion on LAA UL LBR Design, 3GPP TSG-RAN WG1 Meeting #84-BIS, Apr. 11-15, 2016, R1-162851, Broadcom Limited, Busan.
International Search Report and Written Opinion of International Application No. PCT/CN2020/103817 issued by the Chinese Patent Office on Oct. 13, 2020.

* cited by examiner

CHANNEL SENDING METHOD AND DEVICE

CROSS-REFERENCE TO RELATED APPLICATIONS

This application is a Bypass Continuation application of PCT/CN2020/103817 filed on Jul. 23, 2020, which claims priority to Chinese Patent Application No. 201910668206.4, filed on Jul. 23, 2019, which are incorporated herein by reference in their entirety.

TECHNICAL FIELD

Embodiments of the present disclosure relate to the field of communications technologies, and in particular, to a channel sending method and device.

BACKGROUND

Currently, a plurality of devices may share an unlicensed band (unlicensed band). To ensure that all devices can use an unlicensed band fairly, the devices need to follow a specific rule when using the unlicensed band.

SUMMARY

Embodiments of the present disclosure provide a channel sending method and device.

According to a first aspect, an embodiment of the present disclosure provides a channel sending method. The method may be applied to a UE. The method includes: determining a first transmission parameter, and sending P uplink channels based on the first transmission parameter. The first transmission parameter includes at least one of following: a time domain resource, a redundancy version (RV), or a hybrid automatic repeat request (HARQ) process number, the time domain resource includes at least one of N candidate transmission opportunities, the N candidate transmission opportunities correspond to M uplink channels, and N, M, and P are all positive integers.

According to a second aspect, an embodiment of the present disclosure provides a UE, and the UE includes a determining module and a sending module. The determining module is configured to determine a first transmission parameter. The sending module is configured to send P uplink channels based on the first transmission parameter determined by the determining module. The first transmission parameter includes at least one of following: a time domain resource, an RV, or a HARQ process number, the time domain resource includes at least one of N candidate transmission opportunities, the N candidate transmission opportunities correspond to M uplink channels, and N, M, and P are all positive integers.

According to a third aspect, an embodiment of the present disclosure provides a UE, including a processor, a memory, and a computer program that is stored in the memory and executable on the processor, and when the computer program is executed by the processor, the steps of the channel sending method in the first aspect are implemented.

According to a fourth aspect, an embodiment of the present disclosure provides a non-transitory computer-readable storage medium, where the non-transitory computer-readable storage medium stores a computer program, and when the computer program is executed by a processor, the steps of the channel sending method in the first aspect are implemented.

DETAILED DESCRIPTION OF EMBODIMENTS

Figure 1:
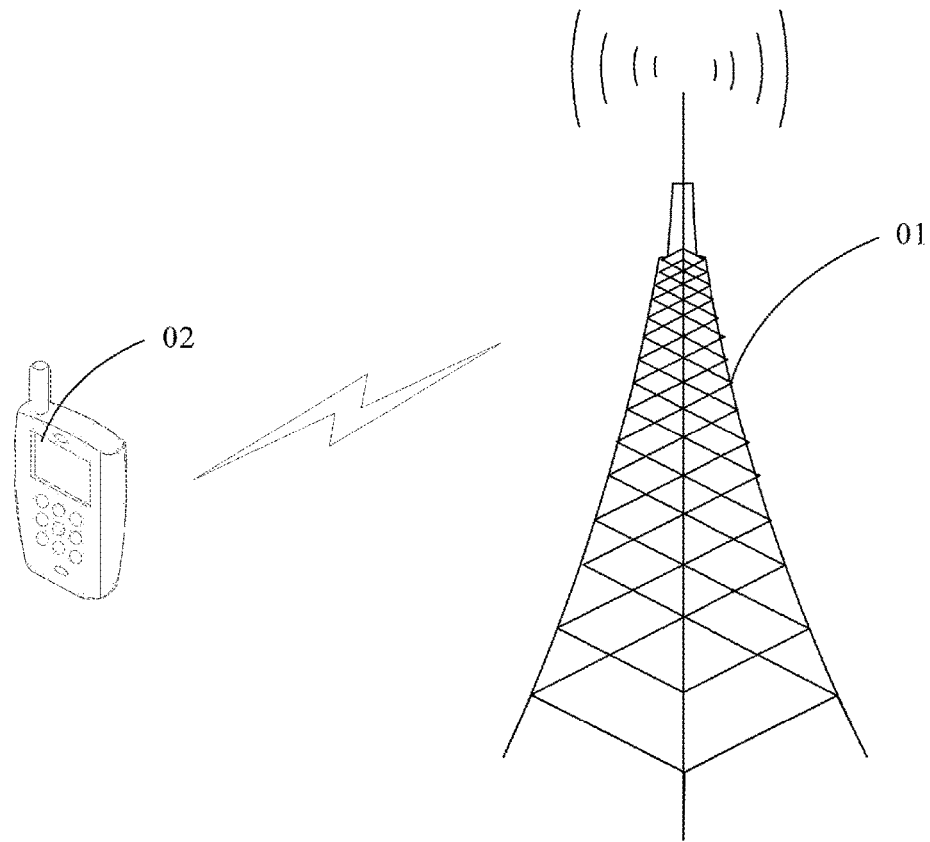
FIG. 1 is a schematic architectural diagram of a communications system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

It should be understood that in this specification, a term "and/or" is an associative relationship for describing associated objects, indicating that three relationships may exist, for example, A and/or B, which may indicate three situations: A exists independently; A and B exist simultaneously; and B exists independently. In this specification, a symbol "I" indicates an "or" relationship between associated objects, for example, AB indicates A or B.

In the embodiments of the present disclosure, the word such as "example" or "for example" is used to represent giving an example, an illustration, or a description. Any embodiment or design scheme described as an "example" or "for example" in the embodiments of the present disclosure should not be explained as being more preferred or having more advantages than another embodiment or design scheme. Exactly, use of the term "example" or "for example" is intended to present a concept in a specific manner.

In the descriptions of the embodiments of the present disclosure, unless otherwise stated, "a plurality of" means two or more, for example, a plurality of elements mean two or more elements.

Taking a user equipment (UE) as an example, when the UE transmits data by using the unlicensed band, the UE may first perform energy detection (ED) on a channel by using a listen before talk (LBT) rule, and then perform data transmission. For example, when the UE detects that energy of the channel is lower than a threshold, the UE may determine that the channel is idle, so that the UE can start to send the channel (for example, a physical uplink shared channel (PUSCH)). When the UE detects that the energy of the channel is greater than or equal to the threshold, the UE may determine that the channel is busy, and therefore the UE cannot send the channel.

However, because the plurality of devices share the unlicensed band, a state (idle or busy) of the channel in the unlicensed band continuously changes. Therefore, a time at which the UE starts to send the channel may not be determined, and a transmission resource for sending the channel by the UE cannot be determined. Consequently, a latency and reliability of sending the channel by the UE may be affected, and performance of sending the channel by the UE is poor.

The embodiments of the present disclosure provide a channel sending method and device. A first transmission parameter may be determined, and P uplink channels are sent based on the first transmission parameter, where the first transmission parameter includes at least one of following: a time domain resource, an RV, or a HARQ process number, the time domain resource includes at least one of N candidate transmission opportunities, the N candidate transmission opportunities correspond to M uplink channels, and N, M, and P are all positive integers. In this solution, a time domain resource (including at least one transmission opportunity) may indicate an occasion of sending an uplink channel by the UE, and both an RV and a HARQ process number may indicate a resource for repeatedly sending the uplink channel by the UE. Therefore, the UE may determine, by determining a first transmission parameter (for example, a transmission parameter such as a time domain resource and an RV), a transmission resource for sending the uplink channel by the UE. In this way, the UE can directly send the uplink channel based on the transmission resource (the first transmission parameter) determined by the UE, so that a low latency and high reliability of sending the uplink channel by the UE can be ensured. In this way, the channel sending method provided in this embodiment of the present disclosure can improve a capability of sending the uplink channel by the UE.

The channel sending method provided in the embodiments of the present disclosure may be applied to a communications system. The communications system may be a wireless communications system, and the wireless communications system may include a network device and a UE. As shown in FIG. 1, FIG. 1 is a schematic architectural diagram of a wireless communications system according to the embodiments of the present disclosure. In FIG. 1, the wireless communications system may include a network device 01 and a UE 02. A connection may be established between the network device 01 and the UE 02. It can be understood that the network device 01 and the UE 02 may be connected wirelessly.

Optionally, in the embodiments of the present disclosure, the UE is a device that provides a user with voice and/or data connectivity, a handheld device that has a wired/wireless connection function, or another processing device connected to a wireless modem. The UE may communicate with one or more core networks by using a radio access network (RAN). The UE may be a mobile terminal, for example, a mobile phone (or referred to as a "cellular" phone) and a computer that has a mobile terminal; or may be a portable, pocket-sized, handheld, computer built-in, or in-vehicle mobile apparatus that exchanges voice and/or data with the RAN, for example, a device such as a personal communications service (PCS) phone, a cordless phone, a session initiation protocol (SIP) phone, a wireless local loop (WLL) station, or a personal digital assistant (PDA). The UE may also be referred to as a user agent, a UE, or the like.

In the embodiments of the present disclosure, the network device is a device that is disposed in the RAN and that is configured to provide a wireless communication function for the UE. In the embodiments of the present disclosure, the network device may be a base station, and the base station may include various forms such as a macro base station, a micro base station, a relay station, and an access point. In systems using different radio access technologies, names of devices having functions of a base station may vary. For example, in a 5G system, the network device may be referred to as a 5G base station (gNB). In a fourth generation (4G) system, such as a long term evolution (LTE) system, the network device may be referred to as an evolved NodeB (eNB). In a third generation mobile communications (3G) system, the network device may be referred to as a NodeB or the like. The name "base station" may vary with evolution of communications technologies.

In the embodiments of the present disclosure, when the network device (for example, a base station) schedules a service of the UE (for example, an ultra-reliable and low latency communications (URLLC) service), the UE may send the service to the network device by sending an uplink channel. Optionally, the UE may first determine a transmission parameter (for example, the first transmission parameter in the embodiments of the present disclosure) for sending the uplink channel, and then send the uplink channel based on the transmission parameter. In this way, the UE can send the uplink channel on a determined resource, thereby ensuring a latency and reliability of sending the uplink channel by the UE.

The following uses an example to describe the channel sending method provided in the embodiments of the present disclosure with reference to the accompanying drawings.

Figure 2:
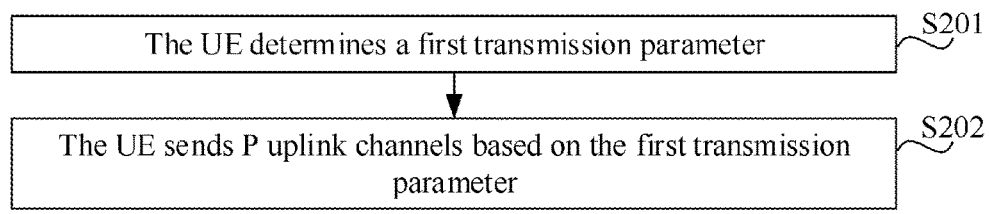
FIG. 2 is a first schematic diagram of a channel sending method according to an embodiment of the present disclosure.

Based on the communications system shown in FIG. 1, an embodiment of the present disclosure provides a channel sending method. As shown in FIG. 2, the channel sending method may be applied to a UE, and the channel sending method may include the following S201-S202.

S201. The UE determines a first transmission parameter.

S202. The UE sends P uplink channels based on the first transmission parameter.

The first transmission parameter may include at least one of following: a time domain resource, an RV, or a HARQ process number, the time domain resource may include at least one of N candidate transmission opportunities, the N candidate transmission opportunities may correspond to M uplink channels, and N, M, and P are all positive integers.

It should be noted that the first transmission parameter may further include any other possible parameter. This may be specifically determined based on an actual use requirement, and is not limited in this embodiment of the present disclosure.

In this embodiment of the present disclosure, the UE may determine the first transmission parameter, and send the P uplink channels based on the first transmission parameter after determining the first transmission parameter, so that the UE can send an uplink channel on a determined resource, thereby ensuring a latency and reliability of sending the uplink channel by the UE.

Optionally, in this embodiment of the present disclosure, an uplink channel in the P uplink channels may be any possible uplink channel such as a PUSCH or a physical uplink control channel (PUCCH). This may be specifically determined based on an actual use requirement, and is not limited in this embodiment of the present disclosure.

In this embodiment of the present disclosure, an uplink channel in the M uplink channels and an uplink channel in the P uplink channels may be uplink channels of a same type.

For example, in this embodiment of the present disclosure, both the uplink channel in the M uplink channels and the uplink channel in the P uplink channels are PUSCHs.

In this embodiment of the present disclosure, the time domain resource may include at least one transmission opportunity, and the UE may send the P uplink channels on the at least one transmission opportunity. In other words, each of the at least one transmission opportunity may be a sub-time domain resource of the time domain resource, or may be referred to as a time domain unit.

In this embodiment of the disclosure, one transmission opportunity may include one or more symbols/slots/sub-frames.

In this embodiment of the present disclosure, one transmission opportunity may be used to send one uplink channel.

It should be noted that, in this embodiment of the present disclosure, each of the N candidate transmission opportunities is one transmission opportunity. In other words, the N candidate transmission opportunities may include N transmission opportunities.

In this embodiment of the present disclosure, a quantity of transmission opportunities included in the time domain resource may be less than or equal to a quantity of transmission opportunities of the N candidate transmission opportunities.

Optionally, in this embodiment of the present disclosure, all or a part of the at least one transmission opportunity included in the time domain resource may be transmission opportunities in the N candidate transmission opportunities (for example, a part of the at least one transmission opportunity are transmission opportunities in the N candidate transmission opportunities, and the other part of transmission opportunities are transmission opportunities independently determined by the UE). This may be specifically determined based on an actual use requirement, and is not limited in this embodiment of the present disclosure.

For example, the time domain resource may include 12 transmission opportunities, where the first eight transmission opportunities in the 12 transmission opportunities may be transmission opportunities in the N (N≥12) candidate transmission opportunities, and the last four transmission opportunities in the 12 transmission opportunities may be transmission opportunities independently determined by the UE.

In this embodiment of the present disclosure, the N candidate transmission opportunities may be transmission opportunities indicated by a network device to the UE, and the UE may send an uplink channel on the N candidate transmission opportunities.

Optionally, in this embodiment of the present disclosure, the UE may number the N candidate transmission opportunities based on a number of a start position that is of sending the uplink channel by the UE and that is indicated by the network device.

For example, assuming that the quantity of the N candidate transmission opportunities is 4, and the number of the start position that is of sending the uplink channel by the UE and that is indicated by the network device is 1, a number of a first transmission opportunity in the N candidate transmission opportunities may be 1, a number of a second transmission opportunity in the N candidate transmission opportunities may be 2, a number of a third transmission opportunity in the N candidate transmission opportunities may be 3, and a number of a fourth transmission opportunity in the N candidate transmission opportunities may be 4.

Optionally, in this embodiment of the present disclosure, the N candidate transmission opportunities may be N continuous transmission opportunities, or may be N discontinuous transmission opportunities. This may be specifically determined based on an actual use requirement, and is not limited in this embodiment of the present disclosure.

It should be noted that examples in this embodiment of the present disclosure are all described by using an example in which the N candidate transmission opportunities are N continuous candidate transmission opportunities. An implementation in which the N candidate transmission opportunities are N discontinuous candidate transmission opportunities is similar to the implementation in which the N candidate transmission opportunities are N continuous candidate transmission opportunities. To avoid repetition, details are not described in this embodiment of this disclosure.

Optionally, in this embodiment of the present disclosure, the UE may obtain the N candidate transmission opportunities by using first indication information.

Certainly, in actual implementation, the UE may further obtain the N candidate transmission opportunities in any other possible manner. This may be specifically determined based on an actual use requirement, and is not limited in this embodiment of the present disclosure.

Optionally, in this embodiment of the present disclosure, the first indication information may be information indicated by the network device to the UE, information configured by the network device to the UE, or any other possible information. This may be specifically determined based on an actual use requirement, and is not limited in this embodiment of the present disclosure.

Optionally, in this embodiment of the present disclosure, the first indication information may directly indicate the N candidate transmission opportunities, or may indicate M candidate transmission opportunity sets. Each of the M candidate transmission opportunity sets may include K candidate transmission opportunities. N=M×K, and both M and N are positive integers.

In this embodiment of the present disclosure, K candidate transmission opportunities included in each of the M candidate transmission opportunity sets may be used to send one uplink channel. In other words, the UE may repeatedly send one uplink channel K times.

It can be understood that the N candidate transmission opportunities may be used to send the M uplink channels, that is, the N candidate transmission opportunities may correspond to the M uplink channels.

For example, it is assumed that a quantity of the M candidate transmission opportunity sets is 3 (M=3), and each candidate transmission opportunity set includes four candidate transmission opportunities (K=3), that is, a quantity of the N candidate transmission opportunities is 12 (N=3). In this case, the three candidate transmission opportunity sets may be used to send three uplink channels (the M uplink channels): an uplink channel 1, an uplink channel 2, and an uplink channel 3 shown in FIG. 3, that is, the 12 candidate transmission opportunity sets may correspond to the three uplink channels (the uplink channel 1, the uplink channel 2, and the uplink channel 3).

Figure 3:
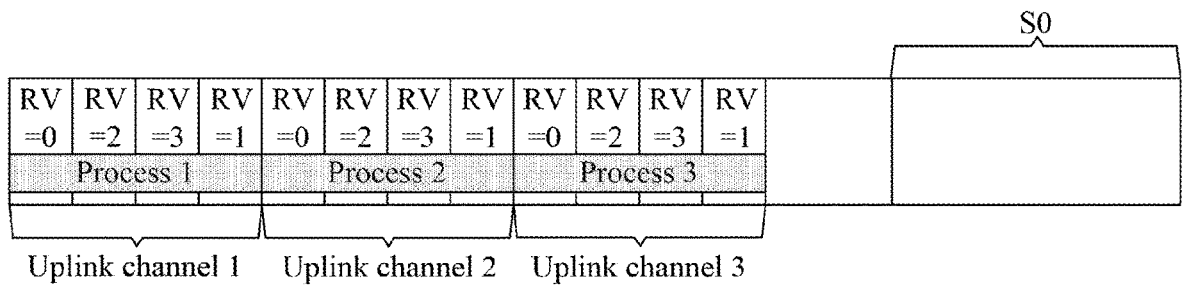
FIG. 3 is a schematic diagram of a transmission parameter indicated by a network device according to an embodiment of the present disclosure.

It should be noted that in the accompanying drawings in this embodiment of the present disclosure, one transmission opportunity is represented by one rectangular frame, first 12 rectangular frames in FIG. 3 are used to indicate the N candidate transmission opportunities in this embodiment of the present disclosure, and S0 in FIG. 3 is used to indicate a slot.

Optionally, in this embodiment of the present disclosure, the first indication information may be further used to indicate at least one of transmission parameters such as an RV sequence or a HARQ process number. This may be specifically determined based on an actual use requirement, and is not limited in this embodiment of the present disclosure.

It should be noted that in this embodiment of the present disclosure, the RV sequence may be an RV that is of sending an uplink channel by the UE and that is indicated by the network device o the UE, and the RV sequence may include Q RVs, for example, "0, 2, 3, and 1". When the UE repeatedly sends one uplink channel, the UE may send the uplink channel by using different RVs in the Q RVs. In other words, one transmission opportunity may correspond to one RV.

The HARQ process number may be a HARQ process number that is of sending a first uplink channel by the UE and that is indicated by the network device to the UE, and a HARQ process number of sending another uplink channel by the UE may be a number obtained by sequentially increasing the HARQ process number indicated by the network device by 1 based on a sequence in which the UE sends the uplink channels.

For example, it is assumed that a quantity of the N candidate transmission opportunities is 12, a quantity of the M uplink channels corresponding to the 12 candidate transmission opportunities is 3, the three uplink channels are an uplink channel 1, an uplink channel 2, and an uplink channel 3, each four candidate transmission opportunities are used to send one uplink channel, and an RV sequence indicated by the network device to the UE is "0, 2, 3, and 1". The network device indicates, to the UE, that the HARQ process number for the first uplink channel is "1". In this case, as shown in FIG. 3, a first candidate transmission opportunity to a fourth candidate transmission opportunity in the 12 candidate transmission opportunities correspond to the uplink channel 1, a fifth candidate transmission opportunity to an eighth candidate transmission opportunity in the 12 candidate transmission opportunities correspond to the uplink channel 2, and a ninth candidate transmission opportunity to a twelfth candidate transmission opportunity in the 12 candidate transmission opportunities correspond to the uplink channel 3. It can be learned from FIG. 3 that an RV corresponding to the uplink channel 1 may be "0, 2, 3, 1", and a HARQ process number corresponding to the uplink channel 1 may be a "process 1"; an RV corresponding to the uplink channel 2 may be "0, 2, 3, 1", and a HARQ process number corresponding to the uplink channel 2 may be a "process 2"; and an RV corresponding to the uplink channel 3 may be "0, 2, 3, 1", and a HARQ process number corresponding to the uplink channel 3 may be a "process 3".

Optionally, in this embodiment of the present disclosure, the UE may repeatedly send an uplink channel in the P uplink channels.

Optionally, in this embodiment of the present disclosure, a form in which the UE sends the uplink channel in the P uplink channels may include two forms: a form 1 and a form 2. The following exemplarily describes the two forms (the form 1 and the form 2).

Form 1: Each of the M uplink channels may correspond to K transmission opportunities, each of the P uplink channels may also correspond to K transmission opportunities, and K is a positive integer.

It can be understood that a quantity of repetition sending times of uplink channels (the P uplink channels) actually sent by the UE may be equal to a quantity of repetition sending times of uplink channels (the M uplink channels) indicated by the network device to the UE, that is, the UE may send the P uplink channels based on a quantity of repetition sending times of uplink channels corresponding to the N candidate transmission opportunities. In this way, reliability of the uplink channels sent by the UE can be ensured.

Form 2: Each of the M uplink channels may correspond to K transmission opportunities, at least one of the P uplink channels may correspond to L transmission opportunities, both L and K are positive integers, and L≤K.

Optionally, in this embodiment of this disclosure, the at least one of the P uplink channels may be a first uplink channel in the P uplink channels, or may be a last uplink channel in the P uplink channels, or may be a first uplink channel and a last uplink channel in the P uplink channels. This may be specifically determined based on an actual use requirement, and is not limited in this embodiment of the present disclosure.

It can be understood that a quantity of repetition sending times of uplink channels (the P uplink channels) actually sent by the UE may be less than or equal to a quantity of repetition sending times of uplink channels that are indicated by the network device to the UE and that are corresponding to the N candidate transmission opportunities, that is, the UE may independently determine the quantity of repetition sending times of sending the uplink channels by the UE. In this way, a form of sending an uplink channel by the UE can be relatively flexible.

This embodiment of the present disclosure provides a channel sending method. A time domain resource (including at least one transmission opportunity) may indicate an occasion of sending an uplink channel by the UE, and both an RV and a HARQ process number may indicate a resource for repeatedly sending the uplink channel by the UE. Therefore, the UE may determine, by determining a first transmission parameter (for example, a transmission parameter such as a time domain resource and an RV), a transmission resource for sending the uplink channel by the UE. In this way, the UE can directly send the uplink channel based on the transmission resource (the first transmission parameter) determined by the UE, so that a low latency and high reliability of sending the uplink channel by the UE can be ensured. In this way, the channel sending method provided in this embodiment of the present disclosure can improve a capability of sending the uplink channel by the UE.

Optionally, in this embodiment of the present disclosure, the UE may determine, based on a moment at which a listening result of channel listening by the UE is idle, a moment at which the UE may start to send a channel, to accurately determine the first transmission parameter based on the moment at which the UE may start to send a channel, thereby accurately determining a resource for sending an uplink channel by the UE.

Figure 4:
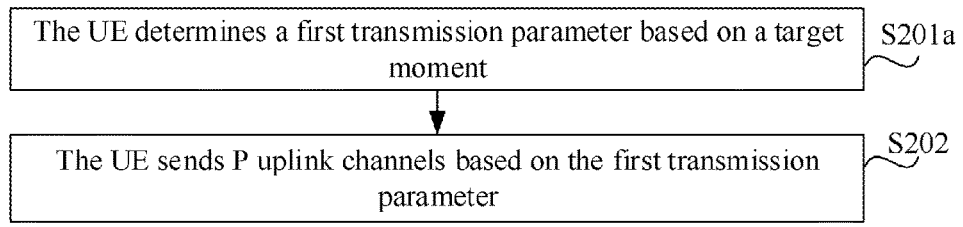
FIG. 4 is a second schematic diagram of a channel sending method according to an embodiment of the present disclosure.

For example, with reference to FIG. 2, as shown in FIG. 4, S201 may be specifically implemented by using the following S201a.

S201a. The UE determines the first transmission parameter based on a target moment.

In this embodiment of the present disclosure, according to an LBT rule, before the UE starts to send a channel, the UE may listen to the channel. Optionally, the UE may perform energy detection on the channel to listen to the channel. When the UE detects that energy of the channel is lower than a threshold, the UE may determine that the channel is idle, that is, the UE may send the channel. When the UE detects that the energy of the channel is greater than or equal to the threshold, the UE may determine that the channel is busy, that is, the UE cannot send the channel.

It can be understood that, in this embodiment of the present disclosure, the listening result of channel listening by the UE is idle before the target moment. Therefore, the UE may start to send the P uplink channels at the target moment.

In this embodiment of the present disclosure, the target moment may be one of the N candidate transmission opportunities.

Certainly, in actual implementation, the UE may determine the first transmission parameter in any other possible manner. This may be specifically determined based on an actual use requirement, and is not limited in this embodiment of the present disclosure.

In this embodiment of the present disclosure, the target moment is a moment at which the UE actually starts to send a channel. Therefore, the target moment may indicate a transmission opportunity on which the UE actually starts to send a channel in the N candidate transmission opportunities. In this way, the UE may accurately determine the first transmission parameter based on the candidate transmission opportunity actually used by the UE, thereby accurately determining a resource for sending an uplink channel by the UE.

Optionally, in this embodiment of the present disclosure, in a case that the first transmission parameter includes the time domain resource, S201a may be specifically implemented by using the following S201a1.

S201a1. The UE determines at least one of following: a start position of the time domain resource, an end position of the time domain resource, or a length of the time domain resource based on the target moment.

In this embodiment of the present disclosure, in a case that the first transmission parameter includes the time domain resource, the UE may determine at least one of the start position of the time domain resource, the end position of the time domain resource, or the length of the time domain resource based on the target moment, and determine the time domain resource.

It should be noted that, in this embodiment of the present disclosure, each of the start position of the time domain resource and the end position of the time domain resource may correspond to one transmission opportunity, and the length of the time domain resource may be used to indicate a quantity of transmission opportunities included in the time domain resource.

Optionally, in this embodiment of the present disclosure, the UE may accurately determine the time domain resource by determining at least two of the start position of the time domain resource, the end position of the time domain resource, and the length of the time domain resource.

Optionally, in this embodiment of the present disclosure, the start position of the time domain resource may be a j-th candidate transmission opportunity. The j-th candidate transmission opportunity may be a candidate transmission opportunity corresponding to the target moment in the N candidate transmission opportunities, $1 \leq j \leq N$, and j is an integer.

Optionally, in this embodiment of the present disclosure, the end position of the time domain resource may be an N-th candidate transmission opportunity in the N candidate transmission opportunities, or may be an N-th transmission opportunity starting from the j-th candidate transmission opportunity.

Optionally, in this embodiment of the present disclosure, the length of the time domain resource may be $(N-j+1)$ transmission opportunities, or may be N transmission opportunities.

Optionally, in this embodiment of the present disclosure, the end position of the time domain resource and the length of the time domain resource may include the following two cases: a case 1 and a case 2. The following separately exemplarily describes the two cases.

Case 1: The end position of the time domain resource is an N-th candidate transmission opportunity in the N candidate transmission opportunities, and the length of the time domain resource is $(N-j+1)$ transmission opportunities.

In the case 1, it is assumed that the N candidate transmission opportunities include M candidate transmission opportunity sets, and each candidate transmission opportunity set may include K candidate transmission opportunities, where each candidate transmission opportunity set may be used to send one uplink channel, that is, the N candidate transmission opportunities may be used to send the M uplink channels. In this case, if a listening result of channel listening by the UE before an A-th candidate transmission opportunity in the N candidate transmission opportunities is idle (the start position of the time domain resource is the A-th candidate transmission opportunity, and j=A), the UE may determine that the end position of the time domain resource is an N-th candidate transmission opportunity, and the length of the time domain resource is $(N-A+1)$ transmission opportunities, that is, the UE may determine that the time domain resource includes a transmission opportunity n, where n=A to N ($N=K \times M$).

It can be understood that, in the case 1, the UE may send an uplink channel on the A-th candidate transmission opportunity to the N-th candidate transmission opportunity in the N candidate transmission opportunities.

Case 2: The end position of the time domain resource is an N-th transmission opportunity starting from the j-th candidate transmission opportunity, and the length of the time domain resource is N transmission opportunities.

In the case 2, it is assumed that the N candidate transmission opportunities include M candidate transmission opportunity sets, and each candidate transmission opportunity set may include K candidate transmission opportunities, where each candidate transmission opportunity set may be used to send one uplink channel, that is, the N candidate transmission opportunities may be used to send the M uplink channels. In this case, if a listening result of channel listening by the UE before an A-th candidate transmission opportunity in the N candidate transmission opportunities is idle (the start position of the time domain resource is the A-th candidate transmission opportunity, and j=A), the UE may determine that the end position of the time domain resource is an N-th transmission opportunity starting from the A-th candidate transmission opportunity, and the length of the time domain resource is N transmission opportunities, that is, the UE may determine that the time domain resource includes a transmission opportunity n, where n=A to (A+N−1), and N=K×M.

It should be noted that, to clearly indicate transmission opportunities included in the time domain resource, the transmission opportunities are numbered in this embodiment of the present disclosure. This embodiment of the present disclosure is merely described by using an example in which a number of a first transmission opportunity of a candidate transmission opportunity indicated by the network device is 1, and the present disclosure is not limited thereto. Optionally, the UE may number, based on a start position of the candidate transmission opportunity indicated by the network device, the transmission opportunities included in the time domain resource determined by the UE. This is not limited in this embodiment of the present disclosure.

It can be understood that, in the case 2, the UE may send an uplink channel on the A-th candidate transmission opportunity to an (A+N−1)-th transmission opportunity.

Figure 5A:
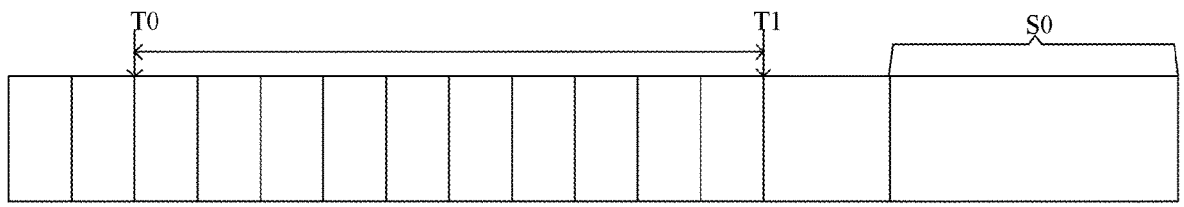
FIG. 5A is a first schematic diagram of determining a first transmission parameter by a UE according to an embodiment of the present disclosure.
Figure 5B:
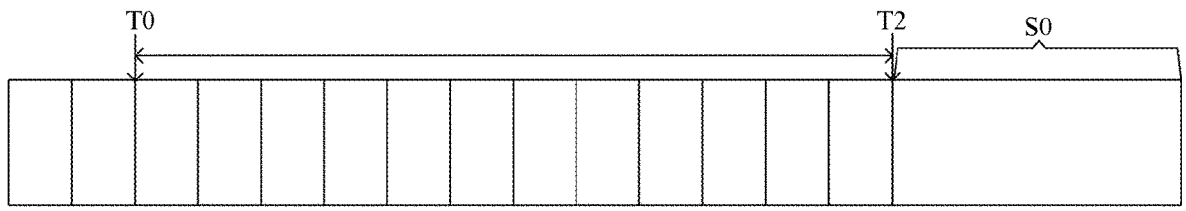
FIG. 5B is a second schematic diagram of determining a first transmission parameter by a UE according to an embodiment of the present disclosure.

For example, it is assumed that a quantity of the N candidate transmission opportunities is 12 (N=12), and the target moment is a third candidate transmission opportunity. In this case, in the case 1, as shown in FIG. 5A, the UE may determine that the third candidate transmission opportunity T0 is the start position of the time domain resource, a twelfth candidate transmission opportunity T1 is the end position of the time domain resource, and the length of the time domain resource is (12−3+1=10) transmission opportunities, where the 10 transmission opportunities may be the third transmission opportunity to the twelfth transmission opportunity shown in FIG. 5A. In the case 2, as shown in FIG. 5B, the UE may determine that the third candidate transmission opportunity T0 is the start position of the time domain resource, a twelfth transmission opportunity T2 starting from the third candidate transmission opportunity is the end position of the time domain resource, and the length of the time domain resource is 12 transmission opportunities. The 12 transmission opportunities may be the third transmission opportunity to a fourteenth transmission opportunity shown in FIG. 5B.

In this embodiment of the present disclosure, because the end position or the length of the time domain resource is different, and the time domain resource is also different, the UE determines an end position or a length of a proper time domain resource based on an actual use requirement, so that the UE can send an uplink channel on the proper time domain resource.

Optionally, in this embodiment of the present disclosure, a time domain resource of a first uplink channel in the P uplink channels may be a first candidate transmission opportunity set.

The first candidate transmission opportunity set may include the following two manners: a manner 1 and a manner 2.

Manner 1: The first candidate transmission opportunity set may include L candidate transmission opportunities, and the L candidate transmission opportunities are candidate transmission opportunities starting from the target moment in K candidate transmission opportunities corresponding to a first uplink channel (an uplink channel corresponding to the target moment in the M uplink channels), where L≤K, and both L and K are positive integers.

Manner 2: The first candidate transmission opportunity set may include K transmission opportunities starting from the target moment, and the K transmission opportunities may include at least one of the N candidate transmission opportunities, where K is a positive integer.

With reference to the foregoing case 1 and the foregoing manner 1:

If a listening result of channel listening by the UE before an A-th candidate transmission opportunity in the N candidate transmission opportunities is idle (the start position of the time domain resource is the A-th candidate transmission opportunity, and j=A), the UE may determine that the end position of the time domain resource is an N-th candidate transmission opportunity, and the length of the time domain resource is (N−A+1) transmission opportunities, that is, the UE may determine that the time domain resource includes a transmission opportunity n, where n=A to N. In addition, the UE may determine that an uplink channel corresponding to the transmission opportunity n is Uplink channel (n)=floor [(n−1)/K]+1, and therefore the UE may determine a time domain resource of an uplink channel corresponding to each transmission opportunity.

Figure 6:
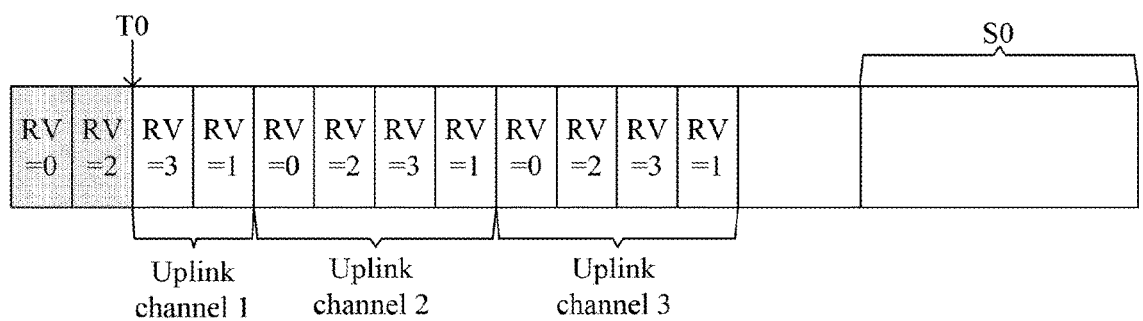
FIG. 6 is a third schematic diagram of determining a first transmission parameter by a UE according to an embodiment of the present disclosure.

For example, it is assumed that a quantity of the N candidate transmission opportunities is 12 (N=12), and a listening result of channel listening by the UE before a third candidate transmission opportunity is idle (A=3). In this case, the UE may determine, based on n=A to N, that the time domain resource is the third transmission opportunity to a twelfth transmission opportunity. In addition, the UE may determine, based on Uplink channel (n)=floor[(n−1)/K]+1, that a time domain resource of a first uplink channel (an uplink channel 1 in FIG. 6) is the third candidate transmission opportunity to a fourth candidate transmission opportunity. The UE may further determine, based on Uplink channel (n)=floor[(n−1)/K]+1, that a time domain resource of a second uplink channel (an uplink channel 2 in FIG. 6) is a fifth candidate transmission opportunity to an eighth candidate transmission opportunity, and a time domain resource of a third uplink channel (an uplink channel 3 in FIG. 6) is a ninth candidate transmission opportunity to the twelfth candidate transmission opportunity.

With reference to the foregoing case 1 and the foregoing manner 2:

If a listening result of channel listening by the UE before an A-th candidate transmission opportunity in the N candidate transmission opportunities is idle (the start position of the time domain resource is the A-th candidate transmission opportunity), the UE may determine that the end position of the time domain resource is an N-th candidate transmission opportunity, and the length of the time domain resource is (N−A+1) transmission opportunities, that is, the UE may determine that the time domain resource includes a transmission opportunity n, where n=A to N. In addition, the UE may determine that an uplink channel corresponding to the transmission opportunity n is Uplink channel (n)=floor[(n−A)/K]+1, and therefore the UE may determine a time domain resource of each uplink channel.

Figure 9:
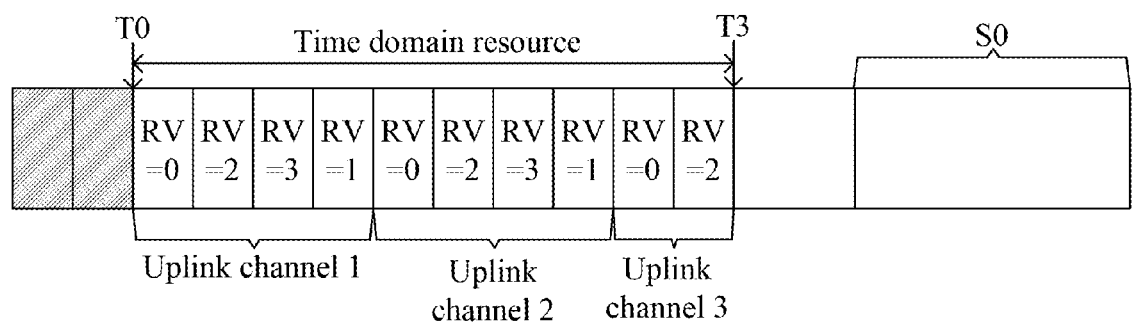
FIG. 9 is a sixth schematic diagram of determining a first transmission parameter by a UE according to an embodiment of the present disclosure.

For example, it is assumed that a quantity of the N candidate transmission opportunities is 12 (N=12), and a listening result of channel listening by the UE before a third candidate transmission opportunity is idle (A=3). In this case, the UE may determine, based on n=A to N, that the time domain resource is the third candidate transmission opportunity to a twelfth candidate transmission opportunity. In addition, the UE may determine, based on Uplink channel (n)=floor[(n−A)/K]+1, that a time domain resource of a first uplink channel (an uplink channel 1 in FIG. 9) is the third candidate transmission opportunity to a sixth candidate transmission opportunity. The UE may further determine, based on Uplink channel (n)=floor[(n−A)/K]+1, that a time domain resource of a second uplink channel (an uplink channel 2 in FIG. 9) is a seventh candidate transmission opportunity to a tenth candidate transmission opportunity, and a time domain resource of a third uplink channel (an uplink channel 3 in FIG. 9) is an eleventh candidate transmission opportunity to the twelfth candidate transmission opportunity.

With reference to the foregoing case 2 and the foregoing manner 2:

If a listening result of channel listening by the UE before an A-th candidate transmission opportunity in the N candidate transmission opportunities is idle (the start position of the time domain resource is the A-th candidate transmission opportunity), the UE may determine that the end position of the time domain resource is an N-th candidate transmission opportunity starting from the A-th candidate transmission opportunity, and the length of the time domain resource is N transmission opportunities, that is, the UE may determine that the time domain resource includes a transmission opportunity n, where n=A to (A+N−1). In addition, the UE may determine that an uplink channel corresponding to the transmission opportunity n is Uplink channel (n)=floor[(n−A)/K]+1, and therefore the UE may determine a time domain resource of each uplink channel.

For example, it is assumed that a quantity of the N candidate transmission opportunities is 12 (N=12, that is, first 12 transmission opportunities in FIG. 7), and a listening result of channel listening by the UE before a third candidate transmission opportunity is idle (A=3). In this case, the UE may determine, based on n=A to (A+N−1), that the time domain resource is the third transmission opportunity to a fourteenth transmission opportunity. In addition, the UE may determine, based on Uplink channel (n)=floor[(n−A)/K]+1, that a time domain resource of a first uplink channel (an uplink channel 1 in FIG. 7) is the third transmission opportunity to a sixth transmission opportunity. The UE may further determine, based on Uplink channel (n)=floor[(n−A)/K]+1, that a time domain resource of a second uplink channel (an uplink channel 2 in FIG. 7) is a seventh transmission opportunity to a tenth transmission opportunity, and a time domain resource of a third uplink channel (an uplink channel 3 in FIG. 7) is an eleventh transmission opportunity to the fourteenth transmission opportunity.

In this embodiment of the present disclosure, the first uplink channel in the P uplink channels may correspond to different transmission opportunities. Therefore, the UE may determine a proper time domain resource for the first uplink channel in the P uplink channels based on an actual use requirement. In this way, the UE can determine proper time domain resources for the P uplink channels, so that the UE can send an uplink channel on a proper time domain resource.

Optionally, in this embodiment of the present disclosure, in a case that the first transmission parameter includes the RV, S201a may be specifically implemented by using the following S201a2.

S201a2. The UE determines, based on the target moment, RVs corresponding to the P uplink channels.

A first RV in the RVs corresponding to the P uplink channels is any one of following: an RV corresponding to the target moment, a first RV in Q RVs, or an RV determined by the UE from the Q RVs. The Q RVs may be RVs obtained by the UE from a network device.

Optionally, in this embodiment of the present disclosure, the Q RVs may be RVs obtained by the UE from first indication information. In other words, the network device may indicate the Q RVs to the UE by using the first indication information.

It can be understood that the RV corresponding to the target moment may be an RV corresponding to the target moment (a candidate transmission opportunity corresponding to the target moment) in the Q RVs indicated by the network device to the UE.

In this embodiment of the present disclosure, each of the N candidate transmission opportunities may correspond to one of the Q RVs.

Certainly, in actual implementation, the UE may determine the RV in any other possible manner. This may be specifically determined based on an actual use requirement, and is not limited in this embodiment of the present disclosure.

In this embodiment of the present disclosure, a case that the UE determines, based on the target moment, the RVs corresponding to the P uplink channels may include two cases: a first case and a second case. The following separately exemplarily describes the two cases (the first case and the second case).

In the first case, the UE may first determine a first RV (hereinafter referred to as an RV 1) in RVs (hereinafter referred to as a first RV set) corresponding to a first uplink channel in the P uplink channels, and then determine another RV in the first RV set and an RV corresponding to an uplink channel other than the first uplink channel in the P uplink channels.

Optionally, in the first case, the RV 1 may be any one of following: an RV corresponding to the target moment, a first RV in Q RVs, or an RV determined by the UE from the Q RVs.

Optionally, in the first case, RVs other than the RV 1 in the first RV set may be determined based on the RV 1 and the Q RVs.

In the first case, after the UE determines the RV 1, the UE may determine an RV that is in the first RV set and that is behind the RV 1 as an RV that is in the Q RVs and that is behind the RV 1. By analogy, the UE may determine RVs other than the RV 1 in the first RV set.

In the first case, a quantity of RVs included in the first RV set may be the same as a quantity of transmission opportunities corresponding to the first uplink channel in the P uplink channels. In other words, each of the transmission opportunities corresponding to the first uplink channel in the P uplink channels may correspond to one RV.

It should be noted that in this embodiment of the present disclosure, the Q RVs may be cyclically used.

It can be understood that if a quantity (denoted as K) of transmission opportunities corresponding to one uplink channel is greater than a quantity (K>Q) of RVs indicated by the UE, the Q RVs may be cyclically used, so that all transmission opportunities corresponding to each uplink channel have corresponding RVs.

For example, it is assumed that the Q RVs are "0, 2, 3, and 1", the UE determines that the RV 1 is "3", and the quantity of RVs in the first RV set is 4, RVs other than the first RV in the first group of RVs may be "1, 0, and 2".

Optionally, in the first case, a first RV in an i-th RV set may be denoted as an RV 2. The RV 2 may be the first RV in the Q RVs, and RVs other than the RV 2 in the i-th RV set may be determined based on the RV 2 and the Q RVs, where $2 \leq i \leq P$ and i is an integer.

In this embodiment of the present disclosure, after the UE determines the RV 2, the UE may determine an RV that is in the i-th RV set and that is behind the RV 2 as a second RV in the Q RVs. By analogy, the UE may determine RVs other than the RV 2 in the i-th RV set.

For example, assuming that the Q RVs are "0, 2, 3, and 1", and a quantity of RVs included in the i-th RV set is 4, the UE may determine that the RV 2 (the first RV in the i-th RV set) is "0", and RVs other than the RV 2 in the i-th RV set may be "2, 3, and 1".

The following separately exemplarily describes the RV 1 (the first RV in the first RV set), RVs other than the RV 1 in the first RV set, and the i-th RV set in different implementations.

In a first implementation, the RV 1 may be an RV corresponding to the target moment in the Q RVs (RVs indicated by the network device).

With reference to the case 1, the manner 1, and the first implementation:

If a listening result of channel listening by the UE before an A-th candidate transmission opportunity in the N candidate transmission opportunities is idle (the start position of the time domain resource is the A-th candidate transmission opportunity), the UE may determine that the time domain resource includes a transmission opportunity n, where n=A to N (N=K×M). In addition, the UE may determine that an uplink channel corresponding to the transmission opportunity n is Uplink channel (n)=floor[(n−1)/K]+1, and the UE may determine that an RV corresponding to the transmission opportunity n is $RV(n)=r_k$, where k=mod (n−1, R)+1, both n and k represent variables, and R is used to indicate a quantity of the Q RVs.

For example, it is assumed that a quantity of the N candidate transmission opportunities is 12 (N=12), the 12 candidate transmission opportunities include three candidate transmission opportunity sets, each candidate transmission opportunity set may include four candidate transmission opportunities, and a candidate transmission opportunity in each candidate transmission opportunity set is used to send an uplink channel (K=4). A listening result of channel listening by the UE is idle (A=3) before a third candidate transmission opportunity, and the Q RVs are "0, 2, 3, 1". In this case, the UE may determine, based on n=A to N, that the time domain resource is the third candidate transmission opportunity to a twelfth candidate transmission opportunity. In addition, the UE may determine, based on Uplink channel (n)=floor[(n−1)/K]+1, that a time domain resource of a first uplink channel (an uplink channel 1 in FIG. 6) is the third candidate transmission opportunity to a fourth candidate transmission opportunity, a time domain resource of a second uplink channel (an uplink channel 2 in FIG. 6) is a fifth candidate transmission opportunity to an eighth candidate transmission opportunity, and a time domain resource of a third uplink channel (an uplink channel 3 in FIG. 6) is a ninth candidate transmission opportunity to the twelfth candidate transmission opportunity. Further, based on $RV(n)=r_k$, where k=mod (n−1, R)+1, the UE may determine that an RV (the RV 1) corresponding to the third transmission opportunity is $RV(3)=r_3=3$, where k=mod (3−1, 4)+1=3; and an RV (an RV other than the RV 1 in the first RV set) corresponding to the fourth transmission opportunity is $RV(4)=r_4=1$, where k=mod (4−1, 4)+1=4, and the like. Both a second group of RVs and a third group of RVs (the i-th RV set) are "0, 2, 3, 1".

Figure 7:
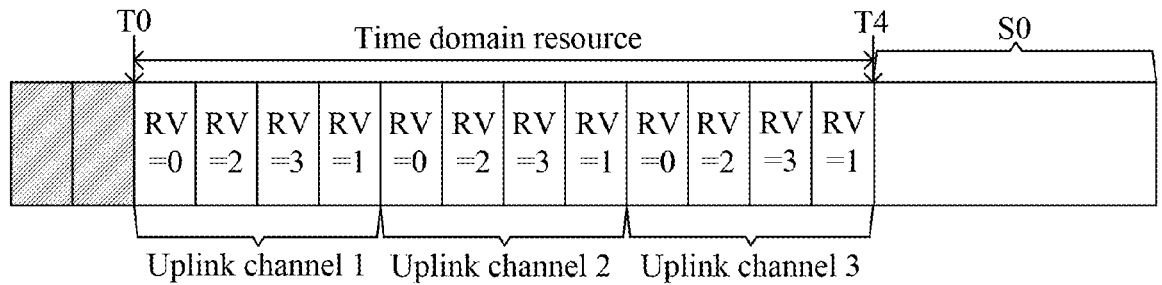
FIG. 7 is a fourth schematic diagram of determining a first transmission parameter by a UE according to an embodiment of the present disclosure.

With reference to the case 2, the manner 2, and the first implementation:

For example, it is assumed that a quantity of the N candidate transmission opportunities is 12 (N=12), the 12 candidate transmission opportunities include three candidate transmission opportunity sets, each candidate transmission opportunity set may include four candidate transmission opportunities, and a candidate transmission opportunity in each candidate transmission opportunity set is used to send an uplink channel (K=4). A listening result of channel listening by the UE is idle before a third candidate transmission opportunity in the 12 candidate transmission opportunities, and the Q RVs are "0, 2, 3, 1". As shown in FIG. 7, the UE may determine that the RV 1 is "0", RVs other than the RV 1 in the first RV set may be "2, 3, 1", and both a second RV set and a third RV set (the i-th RV set) are "0, 2, 3, 1".

In a second implementation, the RV may be the first RV in the Q RVs.

With reference to the case 1, the manner 1, and the second implementation:

If a listening result of channel listening by the UE before an A-th candidate transmission opportunity in the N candidate transmission opportunities is idle (the start position of the time domain resource is the A-th candidate transmission opportunity), the UE may determine that the time domain resource includes a transmission opportunity n, where n=A to N (N=M×K). In addition, the UE may determine that an uplink channel corresponding to the transmission opportunity n is Uplink channel (n)=floor[(n−1)/K]+1. The UE may determine that an RV corresponding to a first uplink channel in uplink channels corresponding to the transmission opportunity n is $RV(n)=r_k$, where k=mod (n−A, R)+1, both n and k represent variables, and R is used to indicate a quantity of the Q RVs; and may determine that an RV corresponding to an uplink channel other than the first uplink channel in the uplink channels corresponding to the transmission opportunity n is $RV(n)=r_k$, where k=mod (n−1, R)+1, both n and k represent variables, and R is used to indicate a quantity of the Q RVs.

Figure 8:
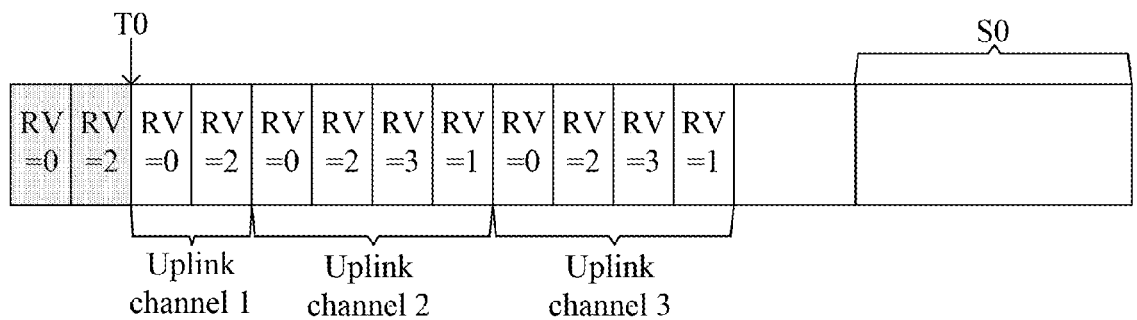
FIG. 8 is a fifth schematic diagram of determining a first transmission parameter by a UE according to an embodiment of the present disclosure.

For example, it is assumed that a quantity of the N candidate transmission opportunities is 12 (N=12), the 12 candidate transmission opportunities include three candidate transmission opportunity sets, each candidate transmission opportunity set may include four candidate transmission opportunities, and a candidate transmission opportunity in each candidate transmission opportunity set is used to send an uplink channel (K=4). A listening result of channel listening by the UE is idle (A=3) before a third candidate transmission opportunity, and the Q RVs are "0, 2, 3, 1". In this case, the UE may determine, based on n=A to N, that the time domain resource is the third candidate transmission opportunity to a twelfth candidate transmission opportunity. In addition, the UE may determine, based on Uplink channel (n)=floor[(n−1)/K]+1, that a time domain resource of a first uplink channel (an uplink channel 1 in FIG. 8) is the third candidate transmission opportunity to a fourth candidate transmission opportunity, a time domain resource of a second uplink channel (an uplink channel 2 in FIG. 8) is a fifth candidate transmission opportunity to an eighth candidate transmission opportunity, and a time domain resource of a third uplink channel (an uplink channel 3 in FIG. 8) is a ninth candidate transmission opportunity to the twelfth candidate transmission opportunity. Further, based on $RV(n)=r_k$, where k=mod (n−A, R)+1, the UE may determine that an RV (the RV 1) corresponding to the third transmission opportunity is $RV(3)=r_3=0$, where k=mod (3−3, 4)+1=1; and an RV (an RV other than the RV 1 in the first RV set) corresponding to the fourth transmission opportunity is $RV(4)=r_4=2$, where k=mod (4−3, 4)+1=2, and the like. Both a second RV set and a third set RV set (the i-th RV set) are "0, 2, 3, 1".

With reference to the case 1, the manner 2, and the second implementation:

If a listening result of channel listening by the UE before an A-th candidate transmission opportunity in the N candidate transmission opportunities is idle (the start position of the time domain resource is the A-th candidate transmission opportunity), the UE may determine that the time domain resource includes a transmission opportunity n, where n=A to N. In addition, the UE may determine that an uplink channel corresponding to the transmission opportunity n is Uplink channel (n)=floor[(n−A)/K]+1, and the UE may determine that an RV corresponding to the transmission opportunity n is $RV(n)=r_k$, where k=mod (n−A, R)+1, and both n and k represent variables.

For example, it is assumed that a quantity of the N candidate transmission opportunities is 12 (N=12), the 12 candidate transmission opportunities include three candidate transmission opportunity sets, each candidate transmission opportunity set may include four candidate transmission opportunities, and a candidate transmission opportunity in each candidate transmission opportunity set is used to send an uplink channel (K=4). A listening result of channel listening by the UE is idle (A=3) before a third candidate transmission opportunity, and the Q RVs are "0, 2, 3, 1". In this case, the UE may determine, based on n=A to N, that the time domain resource is the third candidate transmission opportunity to a twelfth candidate transmission opportunity. In addition, the UE may determine, based on Uplink channel (n)=floor[(n−A)/K]+1, that a time domain resource of a first uplink channel (an uplink channel 1 in FIG. 9) is the third candidate transmission opportunity to a sixth candidate transmission opportunity, a time domain resource of a second uplink channel (an uplink channel 2 in FIG. 9) is a seventh candidate transmission opportunity to a tenth candidate transmission opportunity, and a time domain resource of a third uplink channel (an uplink channel 3 in FIG. 9) is an eleventh candidate transmission opportunity to the twelfth candidate transmission opportunity. Further, based on $RV(n)=r_k$, where k=mod (n−A, R)+1, the UE may determine that an RV (the RV 1) corresponding to the third transmission opportunity is $RV(3)=r_3=3$, where k=mod (3−3, 4)+1=1; and RVs (RVs other than the RV 1 in the first RV set) corresponding to the fourth transmission opportunity to the sixth transmission opportunity are "2, 3, 1". In addition, a second RV set is "0, 2, 3, 1", and a third RV set is "0, 2". The second RV set and the third RV set are the i-th RV set.

In a third implementation, the RV 1 may be an RV determined by the UE from the Q RVs.

Optionally, in this embodiment of the present disclosure, when the target moment is not a first candidate transmission opportunity in candidate transmission opportunities corresponding to uplink channels in the M uplink channels, the UE may select one RV from the Q RVs as the first RV.

Figure 10:
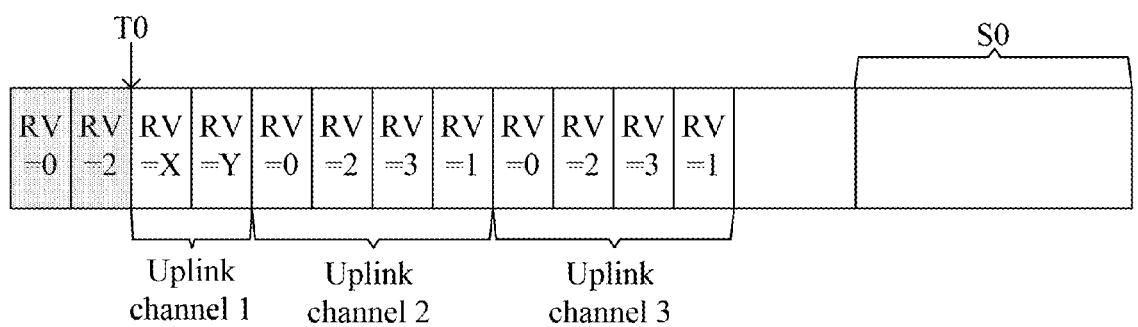
FIG. 10 is a seventh schematic diagram of determining a first transmission parameter by a UE according to an embodiment of the present disclosure.

With reference to the case 1, the manner 1, and the third implementation:

For example, it is assumed that a quantity of the N candidate transmission opportunities is 12 (N=12), the 12 candidate transmission opportunities include three candidate transmission opportunity sets, each candidate transmission opportunity set may include four candidate transmission opportunities, and a candidate transmission opportunity in each candidate transmission opportunity set is used to send an uplink channel (K=4). A listening result of channel listening by the UE is idle before a third candidate transmission opportunity in the 12 candidate transmission opportunities (A=3), and the Q RVs are "0, 2, 3, 1". As shown in FIG. 10, the UE may determine that the RV 1 is "X", an RV other than the RV 1 in the first RV set may be "Y", and both a second RV set and a third RV set (the i-th RV set) are "0, 2, 3, 1".

X in FIG. 10 may be any RV value in the Q RVs "0, 2, 3, 1", and Y may be any RV value in the Q RVs "0, 2, 3, 1".

In the second case, the UE may first determine a first RV (hereinafter referred to as an RV 3) in RVs corresponding to the P uplink channels, and then determine RVs other than the RV 3 in the RVs corresponding to the P uplink channels.

Optionally, in the second case, the RV 3 may be an RV corresponding to the target moment in the Q RVs (RVs indicated by the network device).

Optionally, in the second case, the RVs other than the RV 3 in the RVs corresponding to the P uplink channels may be determined based on the RV 3 and the Q RVs.

In the second case, after the UE determines the RV 3, the UE may determine an RV that is in the RVs corresponding to the P uplink channels and that is behind the RV 3 as an RV that is in the Q RVs and that is behind the RV 3. By analogy, the UE may determine the RVs other than the RV 3 in the RVs corresponding to the P uplink channels.

The following exemplarily describes the second case with reference to the case 2 and the manner 2.

If a listening result of channel listening by the UE before an A-th candidate transmission opportunity in the N candidate transmission opportunities is idle (the start position of the time domain resource is the A-th candidate transmission opportunity), the UE may determine that the time domain resource includes a transmission opportunity n, where n=A to (A+N−1). In addition, the UE may determine that an uplink channel corresponding to the transmission opportunity n is Uplink channel (n)=floor[(n−A)/K]+1, and the UE may determine that an RV corresponding to each transmission opportunity in the time domain resource is $RV(n)=r_k$, where k=mod (n−1, R)+1, and both n and k represent variables.

Figure 11:
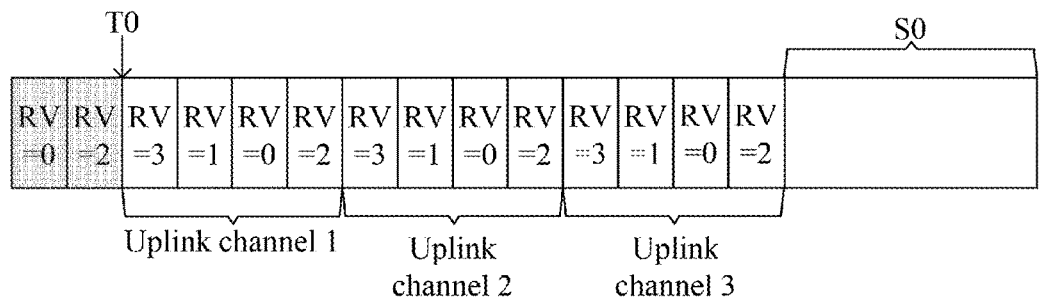
FIG. 11 is an eighth schematic diagram of determining a first transmission parameter by a UE according to an embodiment of the present disclosure.

For example, it is assumed that a quantity of the N candidate transmission opportunities is 12 (N=12), the 12 candidate transmission opportunities (first 12 transmission opportunities in FIG. 11) include three candidate transmission opportunity sets, each candidate transmission opportunity set may include four candidate transmission opportunities, and a candidate transmission opportunity in each candidate transmission opportunity set is used to send an uplink channel (K=4). A listening result of channel listening by the UE is idle before a third candidate transmission opportunity (A=3), and the Q RVs are "0, 2, 3, 1". As shown in FIG. 11, the UE may determine that the time domain resource include the third transmission opportunity to a fourteenth transmission opportunity. In addition, the UE may determine that an uplink channel sent on the third transmission opportunity is Uplink channel (n)=floor[(3−3)/4]+1=1, that is, an uplink channel 1 in FIG. 11. The UE may determine that an uplink channel sent on a seventh transmission opportunity is Uplink channel (n)=floor[(7−3)/4]+1=2, that is, an uplink channel 2 in FIG. 11, and an uplink channel sent on the fourteenth transmission opportunity is Uplink channel (n)=floor[(14−3)/4]+1=3, that is, an uplink channel 3 in FIG. 11. The UE may determine that an RV (that is, the RV 3) corresponding to the third transmission opportunity may be RV(3)=$r_3$=3, where k=mod (3−1, 4)+1=3, and RVs corresponding to a fourth transmission opportunity to the fourteenth transmission opportunity (the RVs other than the RV 3 in the RVs corresponding to the P uplink channels) are "1, 0, 2, 3, 1, 0, 2, 3, 1, 0, 2".

In this embodiment of the present disclosure, because principles of determining RVs are different, and determined RVs are also different, the UE may determine a relatively proper RV by using a proper RV determining principle based on an actual use requirement, so that the UE can send an uplink channel based on the relatively proper RV, thereby improving performance of sending a channel by the UE.

Optionally, in this embodiment of the present disclosure, in a case that the first transmission parameter includes an HARQ process number, S201$a$ may be specifically implemented by using the following S201$a$3.

S201$a$3. The UE determines, based on the target moment, HARQ process numbers corresponding to the P uplink channels.

A first HARQ process number in the HARQ process numbers corresponding to the P uplink channels may be any one of following: a HARQ process number corresponding to the target moment, or a HARQ process number obtained by the UE from a network device.

Optionally, in this embodiment of the present disclosure, when the first transmission parameter includes the HARQ process number, the UE may determine, based on the target moment, a first HARQ process number (hereinafter referred to as a HARQ process number 1) in the HARQ process numbers corresponding to the P uplink channels, and then determine a HARQ process number other than the HARQ process number 1 in the HARQ process numbers corresponding to the P uplink channels.

Optionally, in this embodiment, the HARQ process number 1 may include two manners: a first manner and a second manner, and the two manners are separately described below.

In the first manner, the HARQ process number 1 may be a HARQ process number corresponding to the target moment.

In the second manner, the HARQ process number 1 may be a HARQ process number indicated by the network device.

Optionally, in this embodiment of the present disclosure, each of the N candidate transmission opportunities may correspond to one HARQ process number.

In this embodiment of the present disclosure, the HARQ process number corresponding to each of the N candidate transmission opportunities may be a HARQ process number obtained by the UE from the network device.

It should be noted that in this embodiment of the present disclosure, the HARQ process number corresponding to the target moment may be a HARQ process number corresponding to a candidate transmission opportunity corresponding to the target moment.

Optionally, in this embodiment of the present disclosure, a HARQ process number other than the HARQ process number 1 in the HARQ process numbers corresponding to the P uplink channels may be marked as a HARQ process number i, where the HARQ process number i may be determined based on a HARQ process number (i−1), 2≤i≤P, and i is an integer.

For example, assuming that P=3, and the UE determines that the HARQ process number 1 is "2", the UE may determine that a HARQ process number 2 is "3" and a HARQ process number 3 is "4".

The following separately exemplarily describes the first manner and the second manner.

With reference to the case 1, the manner 2, and the first manner:

If a listening result of channel listening by the UE before an A-th candidate transmission opportunity in the N candidate transmission opportunities is idle (the start position of the time domain resource is the A-th transmission opportunity), the UE may determine that the time domain resource includes a transmission opportunity n, where n=A to N (N=M×K). In addition, the UE may determine that P uplink channels corresponding to the transmission opportunity n are Uplink channel (n)=floor[(n−A)/K]+1, and the UE may determine a corresponding HARQ process number based on a first transmission opportunity corresponding to an uplink channel corresponding to the A-th transmission opportunity (a transmission opportunity for transmitting of the uplink channel for the first time). Optionally, Uplink channel (n)=Uplink channel (x), and HARQ ID (N)=HARQ ID (x)=$p_y$, where y=floor[(x−1)/K]+1, mod (x−1, K)=0, x=1 to n, and n, x, and y all represent variables.

Figure 12:
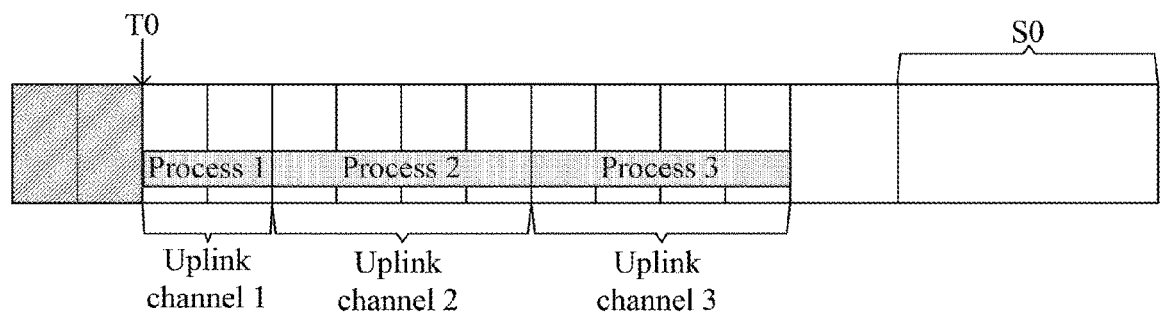
FIG. 12 is a ninth schematic diagram of determining a first transmission parameter by a UE according to an embodiment of the present disclosure.

For example, it is assumed that a quantity of the N candidate transmission opportunities is 12 (N=12), the 12 candidate transmission opportunities include three candidate transmission opportunity sets, each candidate transmission opportunity set may include four candidate transmission opportunities, and a candidate transmission opportunity in each candidate transmission opportunity set is used to send an uplink channel (K=4). If a listening result of channel listening by the UE is idle before a third candidate transmission opportunity (A=3), the UE may determine, based on n=A to N, that the time domain resource is the third candidate transmission opportunity to a twelfth candidate transmission opportunity. In addition, the UE may determine, based on Uplink channel (n)=floor[(n−1)/K]+1, that an uplink channel 1 is sent on the third candidate transmission opportunity to a fourth candidate transmission opportunity, an uplink channel 2 is sent on a fifth candidate transmission opportunity to an eighth candidate transmission opportunity, and an uplink channel 3 is sent on a ninth candidate transmission opportunity to the twelfth candidate transmission opportunity. That is, the UE may determine P=3. The UE may determine that a HARQ process number (a HARQ process number 1) corresponding to the third candidate transmission opportunity to the fourth candidate transmission opportunity may be a HARQ process number corresponding to the third candidate transmission opportunity, that is, HARQ ID(4)=HARQ ID(3)=$p_y$=$P_1$, where y=floor[(3−1)/4]+1=1, for example, a process 1 shown in FIG. 12. Therefore, the UE may determine, based on the HARQ process number 1, that a HARQ process number (a HARQ process number 2) corresponding to the fifth candidate transmission opportunity to the eighth candidate transmission opportunity may be 2, for example, a process 2 shown in FIG. 12, and may determine, based on the HARQ process number 2, that a HARQ process number (a HARQ process number 3) corresponding to the ninth candidate transmission opportunity to the twelfth candidate transmission opportunity may be 3, for example, a process 3 shown in FIG. 12.

With reference to the case 1, the manner 2, and the second manner:

If a listening result of channel listening by the UE before an A-th candidate transmission opportunity in the N candidate transmission opportunities is idle (the start position of the time domain resource is the A-th transmission opportunity), the UE may determine that the time domain resource includes a transmission opportunity n, where n=A to N (N=M×K). In addition, the UE may determine that P uplink channels corresponding to the transmission opportunity n are Uplink channel (n)=floor[(n−A)/K]+1, and the UE may determine that the HARQ process number is HARQ ID (n)=$p_z$, where z=mod (n−A, M)+1, mod (z−A, K)=0, x=1 to n, and n, x, and z all represent variables.

Figure 13:
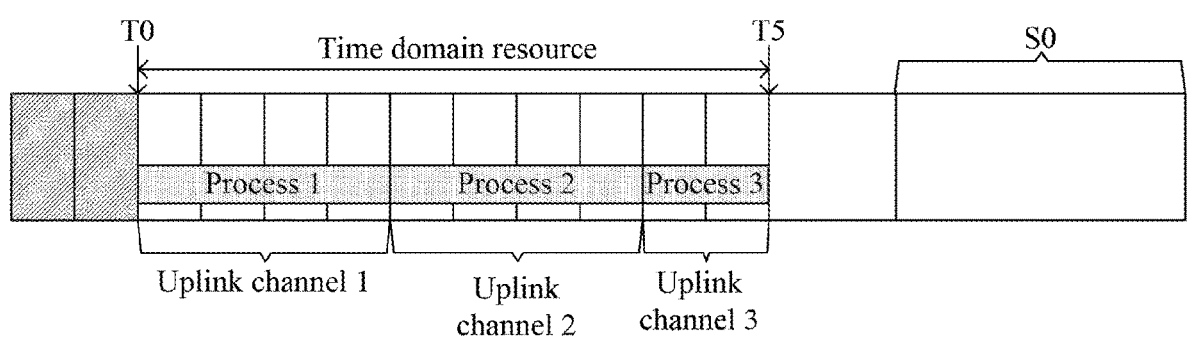
FIG. 13 is a tenth schematic diagram of determining a first transmission parameter by a UE according to an embodiment of the present disclosure.

For example, it is assumed that a quantity of the N candidate transmission opportunities is 12 (N=12), the 12 candidate transmission opportunities include three candidate transmission opportunity sets, each candidate transmission opportunity set may include four candidate transmission opportunities, and a candidate transmission opportunity in each candidate transmission opportunity set is used to send an uplink channel (K=4). If a listening result of channel listening by the UE is idle before a third candidate transmission opportunity (A=3), the UE may determine, based on n=A to N, that the time domain resource is the third transmission opportunity to a twelfth transmission opportunity. In addition, it is determined, based on Uplink channel (n)=floor[(n−A)/K]+1, that an uplink channel 1 is sent on the third transmission opportunity to a sixth transmission opportunity, an uplink channel 2 is sent on a seventh transmission opportunity to a tenth transmission opportunity, and an uplink channel 3 is sent on an eleventh candidate transmission opportunity to the twelfth candidate transmission opportunity. That is, the UE may determine P=3. Further, the UE may determine that a HARQ process number (a HARQ process number 1) corresponding to the third transmission opportunity to the sixth candidate transmission opportunity may be a HARQ process number corresponding to the third transmission opportunity, that is, HARQ ID(1)=$P_1$, where z=mod (3−3, 3)+1, for example, a process 1 shown in FIG. 13. Therefore, the UE may determine, based on the HARQ process number 1, that a HARQ process number (a HARQ process number 2) corresponding to the seventh candidate transmission opportunity to the tenth candidate transmission opportunity may be 2, for example, a process 2 shown in FIG. 13, and may determine, based on the HARQ process number 2, that a HARQ process number (a HARQ process number 3) corresponding to the eleventh candidate transmission opportunity to the twelfth candidate transmission opportunity may be 3, for example, a process 3 shown in FIG. 13.

With reference to the case 2, the manner 2, and the second manner:

If a listening result of channel listening by the UE before an A-th candidate transmission opportunity in the N candidate transmission opportunities is idle (the target moment is a start position of the A-th transmission opportunity), the UE may determine that the time domain resource includes a transmission opportunity n, where n=A to (A+N−1) and N=K×M. In addition, the UE may determine that an uplink channel corresponding to the transmission opportunity n is Uplink channel (n)=floor[(n−A)/K]+1, and the UE may determine that the HARQ process number is HARQ ID (n)=$p_z$, where z=mod (n−A, M)+1, mod (z−A, K)=0, x=1 to n, and n, x, and z all represent variables.

Figure 14:
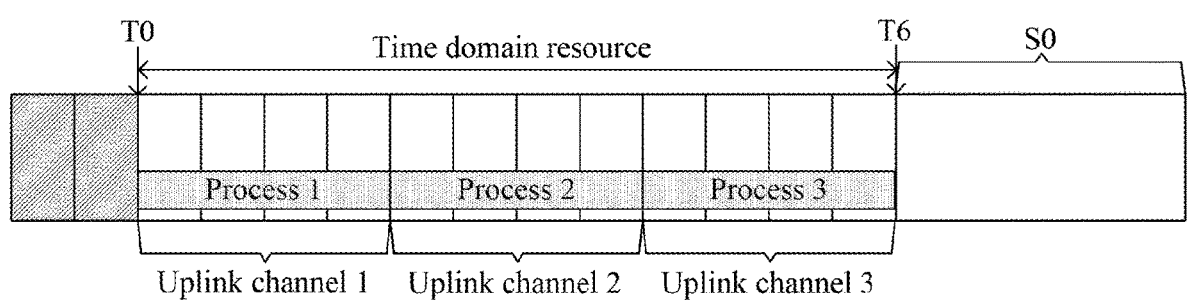
FIG. 14 is an eleventh schematic diagram of determining a first transmission parameter by a UE according to an embodiment of the present disclosure.

For example, it is assumed that a quantity of the N candidate transmission opportunities is 12 (N=12), the 12 candidate transmission opportunities (first 12 transmission opportunities in FIG. 14) include three candidate transmission opportunity sets, each candidate transmission opportunity set may include four candidate transmission opportunities, and a candidate transmission opportunity in each candidate transmission opportunity set is used to send an uplink channel (K=4). If a listening result of channel listening by the UE is idle before a third candidate transmission opportunity (A=3), and a HARQ process number indicated by the network is "1", the UE may determine, based on n=A to (A+N−1), that the time domain resource is the third transmission opportunity to a fourteenth candidate transmission opportunity. In addition, it is determined, based on Uplink channel (n)=floor[(n−A)/K]+1, that an uplink channel 1 is sent on the third transmission opportunity to a sixth transmission opportunity, an uplink channel 2 is sent on a seventh transmission opportunity to a tenth transmission opportunity, and an uplink channel 3 is sent on an eleventh transmission opportunity to the fourteenth transmission opportunity. That is, the UE may determine P=3. Further, the UE may determine that a HARQ process number (a HARQ process number 1) corresponding to the third transmission opportunity to the sixth candidate transmission opportunity may be a HARQ process number corresponding to the third transmission opportunity, that is, HARQ ID(1)=$P_1$, where z=mod (3−3, 3)+1, for example, a process 1 shown in FIG. 14. Therefore, the UE may determine, based on the HARQ process number 1, that a HARQ process number (a HARQ process number 2) corresponding to the seventh candidate transmission opportunity to the tenth candidate transmission opportunity may be 2, for example, a process 2 shown in FIG. 14, and may determine, based on the HARQ process number 2, that a HARQ process number (a HARQ process number 3) corresponding to the eleventh candidate transmission opportunity to the fourteenth candidate transmission opportunity may be 3, for example, a process 3 shown in FIG. 14.

In this embodiment of the present disclosure, because principles of determining HARQ process numbers are different, and determined HARQ process numbers are also different, the UE may determine a relatively proper HARQ process number by using a proper HARQ process number determining principle based on an actual use requirement, so that the UE can send a channel based on the relatively proper HARQ process number, thereby improving performance of sending a channel by the UE.

Optionally, in this embodiment of the present disclosure, after the UE determines the first transmission parameter, the UE may further send one piece of information (for example, uplink control information in this embodiment of the present disclosure), so that the network device can be notified, based on the information, of a transmission parameter actually used by the UE to send an uplink channel or an actually sent uplink channel.

Figure 15:
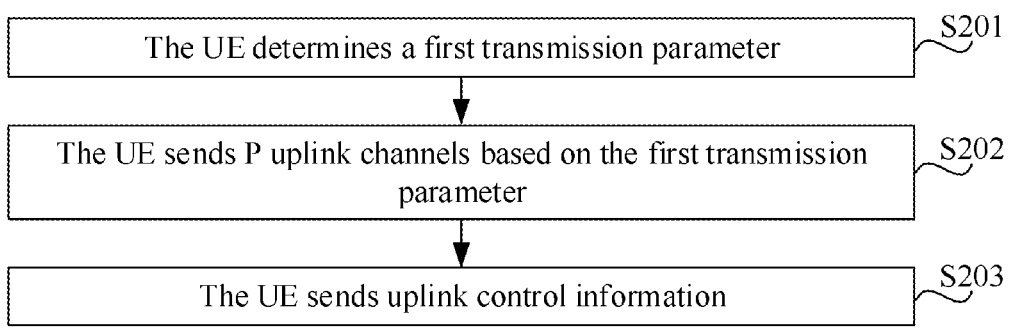
FIG. 15 is a third schematic diagram of a channel sending method according to an embodiment of the present disclosure.

For example, with reference to FIG. 2, as shown in FIG. 15, after S201, the channel sending method provided in this embodiment of the present disclosure may further include the following S203.

S203. The UE sends uplink control information.

The uplink control information may include at least one of following: an RV, a HARQ process number, or a new data indicator (NDI).

It should be noted that in this embodiment of the present disclosure, the uplink control information may further include any other possible content. This may be specifically determined based on an actual use requirement, and is not limited in this embodiment of the present disclosure.

In this embodiment of the present disclosure, the NDI may be used to indicate whether target data transmitted by the UE is retransmitted data, and the target data may be data carried on the P uplink channels.

Certainly, in actual implementation, the UE may further notify, in another manner, the network device of a transmission parameter actually used by the UE to send an uplink channel or an actually sent uplink channel. This may be specifically determined based on an actual use requirement, and is not limited in this embodiment of the present disclosure.

It should be noted that an execution sequence between S203 and S202 may not be limited in this embodiment of the present disclosure. That is, in this embodiment of the present invention, S203 may be performed before S202, or S202 may be performed before S203, or S203 and S202 may be simultaneously performed. FIG. 15 is described by using an example in which S202 is performed before S203.

In this embodiment of the present disclosure, after the UE determines the first transmission parameter, the UE may send the uplink control information to the network device. In this way, the network device may determine a transmission parameter actually used by the UE to send an uplink channel or an actually sent uplink channel, so that the network device can monitor a state of sending an uplink channel by the UE.

It should be noted that, in this embodiment of the present disclosure, the channel sending methods shown in the foregoing accompanying drawings are described by using an example with reference to one of the accompanying drawings in this embodiment of the present disclosure. Optionally, the channel sending methods shown in the foregoing accompanying drawings may be further implemented with reference to any other accompanying drawings that may be combined shown in the foregoing embodiments. Details are not described herein again.

Figure 16:
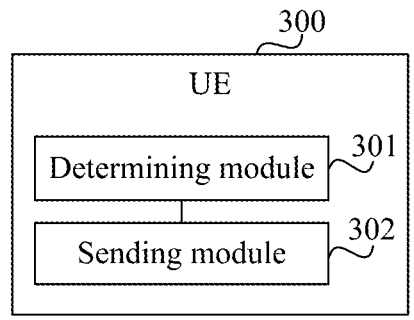
FIG. 16 is a first schematic structural diagram of a UE according to an embodiment of the present disclosure.

As shown in FIG. 16, an embodiment of the present disclosure provides UE 300. The UE 300 may include a determining module 301 and a sending module 302. The determining module 301 is configured to determine a first transmission parameter. The sending module 302 is configured to send P uplink channels based on the first transmission parameter determined by the determining module 301. The first transmission parameter includes at least one of following: a time domain resource, an RV, or a HARQ process number, the time domain resource includes at least one of N candidate transmission opportunities, the N candidate transmission opportunities correspond to M uplink channels, and N, M, and P are all positive integers.

Optionally, the determining module 301 is determine the first transmission parameter based on a target moment, where a listening result of channel listening by the UE is idle before the target moment, and the target moment is one candidate transmission opportunity in the N candidate transmission opportunities.

Optionally, the first transmission parameter includes the time domain resource. The determining module 301 is specifically configured to determine at least one of following: a start position of the time domain resource, an end position of the time domain resource, or a length of the time domain resource based on the target moment.

Optionally, the start position is a j-th candidate transmission opportunity. The end position of the time domain resource is an N-th candidate transmission opportunity in the N candidate transmission opportunities, or an N-th transmission opportunity starting from the j-th candidate transmission opportunity. The length of the time domain resource is (N−j+1) transmission opportunities, or N transmission opportunities. The j-th candidate transmission opportunity is a candidate transmission opportunity corresponding to the target moment in the N candidate transmission opportunities, $1 \leq j \leq N$, and j is an integer.

Optionally, the first transmission parameter includes the RV. The determining module 301 is configured to determine, based on the target moment, RVs corresponding to the P uplink channels. A first RV in the RVs corresponding to the P uplink channels is any one of following: an RV corresponding to the target moment, a first RV in Q RVs, or an RV determined by the UE from the Q RVs. The Q RVs are RVs obtained from a network device.

Optionally, the first transmission parameter includes a HARQ process number. The determining module 301 is configured to determine, based on the target moment, HARQ process numbers corresponding to the P uplink channels. A first HARQ process number in the HARQ process numbers corresponding to the P uplink channels is any one of following: a HARQ process number corresponding to the target moment, or a HARQ process number obtained from a network device.

Optionally, each of the M uplink channels corresponds to K transmission opportunities, each of the P uplink channels corresponds to K transmission opportunities, and K is a positive integer.

Optionally, each of the M uplink channels corresponds to K transmission opportunities, at least one of the P uplink channels corresponds to L transmission opportunities, both L and K are positive integers, and $L \leq K$.

Optionally, the sending module 302 is further configured to send uplink control information after the determining module 301 determines the first transmission parameter, where the uplink control information includes at least one of following: an RV, a HARQ process number, or an NDI.

The UE provided in this embodiment of the present disclosure can implement the processes performed by the UE in the foregoing channel sending method embodiment, and can achieve a same technical effect. To avoid repetition, details are not described herein again.

This embodiment of the present disclosure provides a UE. A time domain resource (including at least one transmission opportunity) may indicate an occasion of sending an uplink channel by the UE, and both an RV and a HARQ process number may indicate a resource for repeatedly sending the uplink channel by the UE. Therefore, the UE may determine, by determining a first transmission parameter (for example, a transmission parameter such as a time domain resource and an RV), a transmission resource for sending the uplink channel by the UE. In this way, the UE can directly send the uplink channel based on the transmission resource (the first transmission parameter) determined by the UE, so that a low latency and high reliability of sending the uplink channel by the UE can be ensured. In this way, the channel sending method provided in this embodiment of the present disclosure can improve a capability of sending the uplink channel by the UE.

Figure 17:
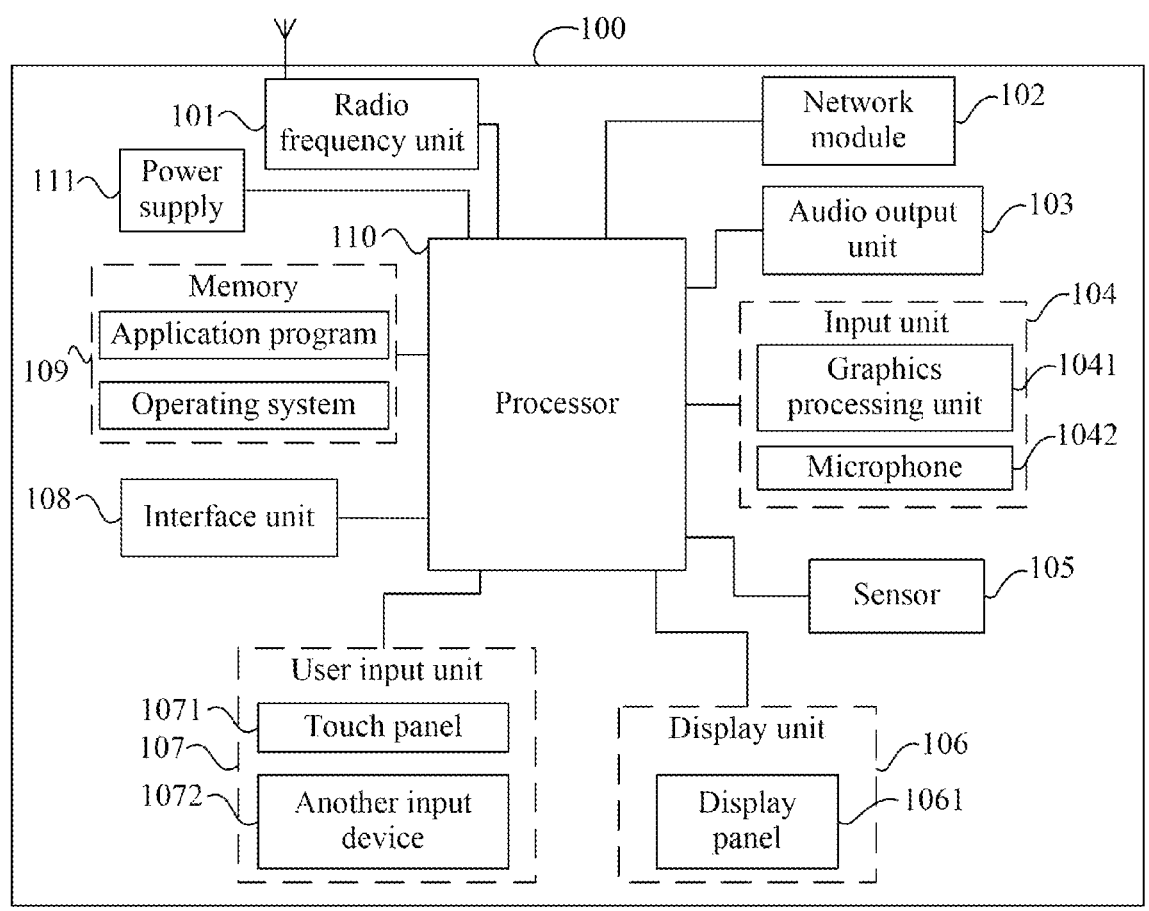
FIG. 17 is a schematic diagram of hardware of a UE according to an embodiment of the present disclosure.

FIG. 17 is a schematic diagram of hardware of a UE according to the embodiments of the present disclosure. As shown in FIG. 17, the UE 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a UE structure shown in FIG. 17 does not constitute any limitation on the UE, and the UE may include more or fewer components than those shown in the figure, or some components are combined, or a different component deployment is used. In this embodiment of the present disclosure, the UE includes but is not limited to a mobile phone, a tablet computer, a notebook computer, a palmtop computer, an in-vehicle terminal, a wearable device, a pedometer, and the like.

The processor 110 is configured to determine a first transmission parameter. The radio frequency unit 101 may be configured to send P uplink channels based on the first transmission parameter determined by the processor 110. The first transmission parameter includes at least one of following: a time domain resource, an RV, or a HARQ process number, the time domain resource includes at least one of N candidate transmission opportunities, the N candidate transmission opportunities correspond to M uplink channels, and N, M, and P are all positive integers.

It can be understood that, in this embodiment of the present disclosure, the determining module 301 in the schematic structural diagram of the foregoing UE (for example, FIG. 16) may be implemented by the foregoing processor 110. The sending module 302 in the schematic structural diagram of the foregoing UE may be implemented by the radio frequency unit 101.

This embodiment of the present disclosure provides a UE. A time domain resource (including at least one transmission opportunity) may indicate an occasion of sending an uplink channel by the UE, and both an RV and a HARQ process number may indicate a resource for repeatedly sending the uplink channel by the UE. Therefore, the UE may determine, by determining a first transmission parameter (for example, a transmission parameter such as a time domain resource and an RV), a transmission resource for sending the uplink channel by the UE. In this way, the UE can directly send the uplink channel based on the transmission resource (the first transmission parameter) determined by the UE, so that a low latency and high reliability of sending the uplink channel by the UE can be ensured. In this way, the channel sending method provided in this embodiment of the present disclosure can improve a capability of sending the uplink channel by the UE.

It should be understood that, in this embodiment of the present disclosure, the radio frequency unit 101 may be configured to receive and send information or a signal in a call process. For example, after receiving downlink data from a base station, the radio frequency unit 101 sends the downlink data to the processor 110 for processing. In addition, the radio frequency unit 101 sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communication system.

The UE 100 provides wireless broadband Internet access for the user by using the network module 102, for example, helping the user to send and receive an e-mail, brows a web page, and access streaming media.

The audio output unit 103 may convert audio data received by the radio frequency unit 101 or the network module 102 or stored in the memory 109 into an audio signal and output the audio signal as a sound. In addition, the audio output unit 103 may further provide an audio output (for example, a call signal received voice, or a message received voice) related to a specific function implemented by the UE 100. The audio output unit 103 includes a speaker, a buzzer, a telephone receiver, and the like.

The input unit 104 is configured to receive an audio signal or a video signal. The input unit 104 may include a graphics processing unit (GPU) 1041 and a microphone 1042, and the graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output.

The UE 100 further includes at least one type of sensor 105, such as a light sensor, a motion sensor, and another sensor. Optionally, the light sensor may include an ambient light sensor and a proximity sensor. The ambient light sensor may adjust luminance of the display panel 1061 based on brightness of ambient light. The proximity sensor may turn off the display panel 1061 and/or backlight when the UE 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the UE 100 (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include a display panel 1061. The display panel 1061 may be configured in a form of a liquid crystal display (LCD), an organic light-emitting diode (OLED), or the like.

The user input unit 107 may be configured to receive input digit or character information, and generate a key signal input related to a user setting and function control of the UE 100. Optionally, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 110, and can receive and execute a command sent by the processor 110. In addition, the touch panel 1071 may be of a resistive type, a capacitive type, an infrared type, a surface acoustic wave type, or the like. The user input unit 107 may include another input device 1072 in addition to the touch panel 1071. Optionally, the another input device 1072 may include but is not limited to a physical keyboard, a functional button (such as a volume control button or a power on/off button), a trackball, a mouse, and a joystick. Details are not described herein.

Optionally, the touch panel 1071 may cover the display panel 1061. When detecting the touch operation on or near the touch panel 1071, the touch panel 1061 transmits the touch operation to the processor 110 to determine a type of a touch event, and then the processor 110 provides corresponding visual output on the display panel 1061 based on the type of the touch event. In FIG. 17, although the touch panel 1071 and the display panel 1061 are used as two independent parts to implement input and output functions of the UE 100, in some embodiments, the touch panel 1071 and the display panel 1061 may be integrated to implement the input and output functions of the UE 100. This is not specifically limited herein.

The interface unit 108 is an interface for connecting an external apparatus with the UE 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 108 may be configured to receive input (for example, data information and power) from an external apparatus and transmit the received input to one or more elements in the UE 100 or may be configured to transmit data between the UE 100 and an external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, and may further include a nonvolatile memory, for example, at least one magnetic disk storage device, a flash storage device, or another volatile solid-state storage device.

The processor 110 is a control center of the UE 100, and connects all parts of the entire UE 100 by using various interfaces and lines. By running or executing a software program and/or a module stored in the memory 109 and invoking data stored in the memory 109, the processor 110 performs various functions and/or data processing of the UE 100, to perform overall monitoring on the UE 100. The processor 110 may include one or more processing units. Optionally, an application processor and a modem processor may be integrated into the processor 110. The application processor mainly processes an operating system, a user interface, an application program, and the like. The modem processor mainly processes wireless communications. It can be understood that, alternatively, the modem processor may not be integrated into the processor 110.

The UE 100 may further include the power supply 111 (such as a battery) that supplies power to each component. Optionally, the power supply 111 may be logically connected to the processor 110 by using a power management system, so as to implement functions such as charging, discharging, and power consumption management by using the power management system.

In addition, the UE 100 includes some function modules not shown, and details are not described herein.

It can be understood that, in this embodiment of the present disclosure, the UE 100 may be the UE 02 in the communications system shown in FIG. 1 in the foregoing embodiment.

An embodiment of the present disclosure further provides a UE, including the processor 110 and the memory 109 shown in FIG. 17, and a computer program that is stored in the memory 109 and executable on the processor 110. When the computer program is executed by the processor 110, the foregoing processes of the channel sending method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by the processor 110 shown in FIG. 17, the processes performed by the UE in the foregoing channel sending method embodiment are implemented and a same technical effect can be achieved. To avoid repetition, details are not described herein again. The non-transitory computer-readable storage medium may include a read-only memory (ROM), a random access memory (RAM), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A channel sending method, comprising:
   determining, by a user equipment (UE), a first transmission parameter, wherein the first transmission parameter comprises at least one of following: a time domain resource, a redundancy version (RV), or a hybrid automatic repeat request (HARQ) process number, the time domain resource comprises at least one of N candidate transmission opportunities, and the N candidate transmission opportunities correspond to M uplink channels; and
   sending, by the UE, P uplink channels based on the first transmission parameter, wherein N, M, and P are all positive integers; wherein
   the determining, by a UE, a first transmission parameter comprises:
   determining, by the UE, the first transmission parameter based on a target moment, wherein a listening result of channel listening by the UE is idle before the target moment, and the target moment is one candidate transmission opportunity in the N candidate transmission opportunities.

2. The method according to claim 1, wherein the first transmission parameter comprises the time domain resource; and
   the determining, by the UE, the first transmission parameter based on a target moment comprises:
   determining, by the UE, at least one of following: a start position of the time domain resource, an end position of the time domain resource, or a length of the time domain resource based on the target moment.

3. The method according to claim 2, wherein the start position is a j-th candidate transmission opportunity, the j-th candidate transmission opportunity is a candidate transmission opportunity corresponding to the target moment in the N candidate transmission opportunities, $1 \leq j \leq N$, and j is an integer;
   the end position is an N-th candidate transmission opportunity in the N candidate transmission opportunities, or an N-th transmission opportunity starting from the j-th candidate transmission opportunity; and
   the length of the time domain resource is (N−j+1) transmission opportunities, or N transmission opportunities.

4. The method according to claim 1, wherein the first transmission parameter comprises the RV; and
   the determining, by the UE, the first transmission parameter based on a target moment comprises:
   determining, by the UE based on the target moment, RVs corresponding to the P uplink channels, wherein
   a first RV in the RVs corresponding to the P uplink channels is any one of following: an RV corresponding to the target moment, a first RV in Q RVs, or an RV determined by the UE from the Q RVs, wherein the Q RVs are RVs obtained from a network device.

5. The method according to claim 1, wherein the first transmission parameter comprises the HARQ process number; and
   the determining, by the UE, the first transmission parameter based on a target moment comprises:
   determining, by the UE based on the target moment, HARQ process numbers corresponding to the P uplink channels, wherein
   a first HARQ process number in the HARQ process numbers corresponding to the P uplink channels is any one of following: a HARQ process number corresponding to the target moment, or a HARQ process number obtained from a network device.

6. The method according to any one of claim 1, wherein each of the M uplink channels corresponds to K transmission opportunities, each of the P uplink channels corresponds to K transmission opportunities, and K is a positive integer.

7. The method according to any one of claim 1, wherein each of the M uplink channels corresponds to K transmission opportunities, at least one of the P uplink channels corresponds to L transmission opportunities, both L and K are positive integers, and $L \leq K$.

8. The method according to any one of claim 1, wherein after the determining, by a UE, a first transmission parameter, the method further comprises:
   sending, by the UE, uplink control information, wherein the uplink control information comprises at least one of following: an RV, a HARQ process number, or a new data indicator (NDI).

9. A user equipment (UE), comprising a processor, a memory, and a computer program that is stored in the memory and executable on the processor, wherein the computer program, when executed by the processor, causes the UE to perform:
   determining, a first transmission parameter, wherein the first transmission parameter comprises at least one of following: a time domain resource, a redundancy version (RV), or a hybrid automatic repeat request (HARQ) process number, the time domain resource comprises at least one of N candidate transmission opportunities, and the N candidate transmission opportunities correspond to M uplink channels; and
   sending, P uplink channels based on the first transmission parameter, wherein N, M, and P are all positive integers; wherein
   the computer program, when executed by the processor, causes the UE to perform:
   determining, the first transmission parameter based on a target moment, wherein a listening result of channel listening is idle before the target moment, and the target moment is one candidate transmission opportunity in the N candidate transmission opportunities.

10. The UE according to claim 9, wherein the computer program, when executed by the processor, causes the UE to perform:
    wherein the first transmission parameter comprises the time domain resource;
    determining, at least one of following: a start position of the time domain resource, an end position of the time domain resource, or a length of the time domain resource based on the target moment.

11. The UE according to claim 10, wherein the computer program, when executed by the processor, causes the UE to perform:
    wherein the start position is a j-th candidate transmission opportunity, the j-th candidate transmission opportunity is a candidate transmission opportunity corresponding to the target moment in the N candidate transmission opportunities, $1 \leq j \leq N$, and j is an integer;
    the end position is an N-th candidate transmission opportunity in the N candidate transmission opportunities, or an N-th transmission opportunity starting from the j-th candidate transmission opportunity; and
    the length of the time domain resource is (N−j+1) transmission opportunities, or N transmission opportunities.

12. The UE according to claim 9, wherein the computer program, when executed by the processor, causes the UE to perform:
wherein the first transmission parameter comprises the RV;
determining, based on the target moment, RVs corresponding to the P uplink channels, wherein
a first RV in the RVs corresponding to the P uplink channels is any one of following: an RV corresponding to the target moment, a first RV in Q RVs, or an RV determined from the Q RVs, wherein the Q RVs are RVs obtained from a network device.

13. The UE according to claim 9, wherein the computer program, when executed by the processor, causes the UE to perform:
wherein the first transmission parameter comprises the HARQ process number;
determining, based on the target moment, HARQ process numbers corresponding to the P uplink channels, wherein
a first HARQ process number in the HARQ process numbers corresponding to the P uplink channels is any one of following: a HARQ process number corresponding to the target moment, or a HARQ process number obtained from a network device.

14. The UE according to claim 9, wherein the computer program, when executed by the processor, causes the UE to perform:
wherein each of the M uplink channels corresponds to K transmission opportunities, each of the P uplink channels corresponds to K transmission opportunities, and K is a positive integer.

15. The UE according to claim 9, wherein the computer program, when executed by the processor, causes the UE to perform:
wherein each of the M uplink channels corresponds to K transmission opportunities, at least one of the P uplink channels corresponds to L transmission opportunities, both L and K are positive integers, and L≤K.

16. The UE according to claim 9, wherein the computer program, when executed by the processor, causes the UE to further perform:
sending, uplink control information, wherein the uplink control information comprises at least one of following: an RV, a HARQ process number, or a new data indicator (NDI).

17. A non-transitory computer-readable storage medium, wherein the non-transitory computer-readable storage medium stores a computer program, and the computer program, when executed by a processor of a user equipment (UE), causes the UE to perform:
determining, a first transmission parameter, wherein the first transmission parameter comprises at least one of following: a time domain resource, a redundancy version (RV), or a hybrid automatic repeat request (HARQ) process number, the time domain resource comprises at least one of N candidate transmission opportunities, and the N candidate transmission opportunities correspond to M uplink channels; and
sending, P uplink channels based on the first transmission parameter, wherein N, M, and P are all positive integers; wherein
the computer program, when executed by the processor, causes the UE to perform:
determining, the first transmission parameter based on a target moment, wherein a listening result of channel listening is idle before the target moment, and the target moment is one candidate transmission opportunity in the N candidate transmission opportunities.

18. The non-transitory computer-readable storage medium according to claim 17, wherein the computer program, when executed by the processor, causes the UE to perform:
wherein the first transmission parameter comprises the time domain resource;
determining, at least one of following: a start position of the time domain resource, an end position of the time domain resource, or a length of the time domain resource based on the target moment.

19. The non-transitory computer-readable storage medium according to claim 18, wherein the computer program, when executed by the processor, causes the UE to perform:
wherein the start position is a j-th candidate transmission opportunity, the j-th candidate transmission opportunity is a candidate transmission opportunity corresponding to the target moment in the N candidate transmission opportunities, 1≤j≤N, and j is an integer;
the end position is an N-th candidate transmission opportunity in the N candidate transmission opportunities, or an N-th transmission opportunity starting from the j-th candidate transmission opportunity; and
the length of the time domain resource is (N−j+1) transmission opportunities, or N transmission opportunities.

20. The non-transitory computer-readable storage medium according to claim 17, wherein the computer program, when executed by the processor, causes the UE to perform:
wherein the first transmission parameter comprises the RV;
determining, based on the target moment, RVs corresponding to the P uplink channels, wherein
a first RV in the RVs corresponding to the P uplink channels is any one of following: an RV corresponding to the target moment, a first RV in Q RVs, or an RV determined from the Q RVs, wherein the Q RVs are RVs obtained from a network device.

* * * * *